United States Patent
Qin et al.

(10) Patent No.: US 12,512,692 B1
(45) Date of Patent: Dec. 30, 2025

(54) SUPERCAPACITOR CONTROL CIRCUIT AND METHOD FOR INTELLIGENTLY IDENTIFYING STARTING MODE OF VEHICLE

(71) Applicant: SHENZHEN LEAGEND OPTOELECTRONICS CO., LTD., Guangdong (CN)

(72) Inventors: Shugang Qin, Guangdong (CN); Junhua Zou, Guangdong (CN)

(73) Assignee: SHENZHEN LEAGEND OPTOELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 19/078,372

(22) Filed: Mar. 13, 2025

Related U.S. Application Data

(63) Continuation of application No. PCT/CN2024/138833, filed on Dec. 12, 2024.

(30) Foreign Application Priority Data

Nov. 25, 2024 (CN) .......................... 202411687198.5

(51) Int. Cl.
*H02J 7/34* (2006.01)
*B60L 50/40* (2019.01)
(Continued)

(52) U.S. Cl.
CPC .............. *H02J 7/345* (2013.01); *B60L 50/40* (2019.02); *B60L 50/60* (2019.02); *H02J 7/0068* (2013.01);
(Continued)

(58) Field of Classification Search
CPC ...... H02J 7/345; H02J 7/0068; H02J 7/00714; H02J 7/007182; B60L 50/40; B60L 50/60
(Continued)

(56) References Cited

U.S. PATENT DOCUMENTS

| | | | | |
|---|---|---|---|---|
| 5,260,637 A | * | 11/1993 | Pizzi | B60L 50/40 320/134 |
| 5,710,699 A | * | 1/1998 | King | B60L 50/40 318/139 |

(Continued)

FOREIGN PATENT DOCUMENTS

| CN | 103915871 A | 7/2014 |
|---|---|---|
| CN | 209658960 U | 11/2019 |
| CN | 118815642 A | 10/2024 |

OTHER PUBLICATIONS

First Office Action received in corresponding Chinese patent application No. 202411687198.5, dated Jan. 23, 2025, 8 pages.

*Primary Examiner* — John T Trischler
(74) *Attorney, Agent, or Firm* — Cooper Legal Group, LLC

(57) ABSTRACT

The present application provides a supercapacitor control circuit and method for intelligently identifying a starting mode of a vehicle, a power supply output terminal of a charging control module is connected to a power supply input terminal of a supercapacitor bank for receiving charging current for energy storage, a power supply output terminal of the supercapacitor bank is connected to a power supply input terminal of a discharging control module for receiving energy storage current and performing discharge control, a power supply output terminal of the discharging control module is connected in parallel to the power supply output terminal of a battery for cooperating with the battery to output instantaneous current required for vehicle start-up, a signal output terminal of an environmental information acquisition module is connected to a third sampled signal input terminal of a main control module for receiving environmental information and generating corresponding discharge control strategies.

8 Claims, 16 Drawing Sheets

(51) Int. Cl.
*B60L 50/60* (2019.01)
*H02J 7/00* (2006.01)

(52) U.S. Cl.
CPC .... *H02J 7/00714* (2020.01); *H02J 7/007182* (2020.01); *B60L 2240/547* (2013.01); *H02J 7/005* (2020.01); *H02J 7/007192* (2020.01); *H02J 2207/20* (2020.01); *H02J 2207/50* (2020.01)

(58) Field of Classification Search
USPC ................................. 320/103, 104, 166, 167
See application file for complete search history.

(56) References Cited

U.S. PATENT DOCUMENTS

| | | | | |
|---|---|---|---|---|
| 5,917,309 A * | 6/1999 | Shimizu | H02J 7/345 | 320/166 |
| 6,061,577 A * | 5/2000 | Andrieu | H02M 3/155 | 323/224 |
| 6,104,759 A * | 8/2000 | Carkner | H04B 1/1607 | 375/295 |
| 6,351,110 B1 * | 2/2002 | Pappalardo | H02J 7/00 | 320/140 |
| 6,788,027 B2 * | 9/2004 | Malik | B60L 15/2045 | 320/134 |
| 6,809,433 B2 * | 10/2004 | Nozu | H02J 7/345 | 363/59 |
| 6,809,502 B2 * | 10/2004 | Tsujii | H02J 7/0016 | 320/150 |
| 6,838,923 B2 * | 1/2005 | Pearson | H01M 8/04917 | 327/309 |
| 6,847,192 B2 * | 1/2005 | Turner | H02J 7/345 | 320/166 |
| 7,038,427 B2 * | 5/2006 | Kok | B60R 16/03 | 320/167 |
| 7,085,123 B2 * | 8/2006 | Shiue | H02J 7/345 | 320/167 |
| 7,091,701 B2 * | 8/2006 | Turner | G06F 1/30 | 320/166 |
| 7,186,473 B2 * | 3/2007 | Shiue | H01M 6/50 | 320/135 |
| 7,591,331 B2 * | 9/2009 | Glonner | B60L 50/40 | 180/65.265 |
| 7,679,337 B2 * | 3/2010 | Yoshida | B60L 53/11 | 320/167 |
| 7,994,756 B2 * | 8/2011 | Rowland | H02J 7/0016 | 320/167 |
| 7,996,124 B2 * | 8/2011 | Kwon | H01M 16/006 | 429/430 |
| 8,121,748 B2 * | 2/2012 | Jeon | B60L 58/31 | 429/430 |
| 8,274,263 B2 * | 9/2012 | McPherson | H02J 7/007188 | 320/158 |
| 8,482,263 B2 * | 7/2013 | Barrade | H02J 7/342 | 320/167 |
| 8,493,036 B2 * | 7/2013 | Ferrario | H02J 7/345 | 320/166 |
| 8,567,547 B2 * | 10/2013 | Kulatunga | B60L 50/66 | 180/212 |
| 8,598,852 B2 * | 12/2013 | Gilmore | B60L 50/16 | 320/167 |
| 9,013,056 B2 * | 4/2015 | Kageyama | E05B 77/54 | 307/10.1 |
| 9,013,066 B2 * | 4/2015 | Kojori | H02J 7/00 | 307/82 |
| 9,071,055 B2 * | 6/2015 | Ferrario | H02J 7/00 | |
| 9,170,075 B2 * | 10/2015 | Kangas | F41H 13/005 | |
| 9,230,748 B1 * | 1/2016 | Semrau | H02J 7/345 | |
| 9,312,723 B2 * | 4/2016 | Nagata | H02J 7/007182 | |
| 9,397,513 B2 * | 7/2016 | Butler | B60L 53/80 | |
| 9,543,784 B2 * | 1/2017 | Huang | B60L 50/40 | |
| 9,666,379 B2 * | 5/2017 | Postiglione | H01G 11/68 | |
| 9,803,609 B2 * | 10/2017 | Setterberg | H02J 1/10 | |
| 9,812,887 B2 * | 11/2017 | Nagata | H02J 7/007182 | |
| 9,816,475 B1 * | 11/2017 | Buchanan | F02N 11/0866 | |
| 9,882,380 B2 * | 1/2018 | Sepe, Jr. | H02M 3/157 | |
| 9,975,447 B2 * | 5/2018 | Tokushige | H01M 10/625 | |
| 10,087,904 B2 * | 10/2018 | Butler | H01M 10/0525 | |
| 10,305,317 B2 * | 5/2019 | Lisini | H02J 7/345 | |
| 10,333,319 B2 * | 6/2019 | Sepe, Jr. | H02J 7/0014 | |
| 10,491,020 B2 * | 11/2019 | Minnickel | B25C 1/06 | |
| 10,596,909 B2 * | 3/2020 | Choi | B60L 50/40 | |
| 10,865,759 B2 * | 12/2020 | Isaranggulnaayudhya | F02N 11/0866 | |
| 11,043,828 B2 * | 6/2021 | Minnickel | H01M 50/213 | |
| 11,046,264 B2 * | 6/2021 | Kageyama | H02J 9/061 | |
| 11,088,549 B2 * | 8/2021 | Lim | H02J 7/0068 | |
| 11,152,805 B2 * | 10/2021 | Minnickel | H01M 50/267 | |
| 11,245,280 B2 * | 2/2022 | Wekwert | H02J 7/34 | |
| 11,355,951 B2 * | 6/2022 | Yen | G11C 5/141 | |
| 11,387,659 B2 * | 7/2022 | Su | H02M 3/156 | |
| 11,476,660 B2 * | 10/2022 | Chen | H02J 7/345 | |
| 11,674,490 B2 * | 6/2023 | Clarke | H02J 7/0042 | 123/179.1 |
| 11,711,010 B2 * | 7/2023 | Sano | H02M 1/0006 | 363/131 |
| 11,726,794 B2 * | 8/2023 | Doi | G06F 1/24 | 713/2 |
| 11,738,432 B2 * | 8/2023 | Minnickel | H02P 4/00 | 320/167 |
| 11,752,894 B2 * | 9/2023 | Wekwert | H02J 7/00714 | 320/105 |
| 11,791,107 B2 * | 10/2023 | Zhou | H02J 7/345 | 320/166 |
| 11,858,359 B2 * | 1/2024 | Trivedi | H02J 7/345 | |
| 11,973,366 B2 * | 4/2024 | Clarke | H02J 7/00308 | |
| 12,057,735 B2 * | 8/2024 | Huang | H02J 7/007182 | |
| 12,064,855 B2 * | 8/2024 | Minnickel | H02J 7/345 | |
| 12,162,374 B2 * | 12/2024 | Wekwert | F02N 11/12 | |
| 12,224,611 B2 * | 2/2025 | Cronin | H02J 7/0013 | |
| 12,278,508 B2 * | 4/2025 | Chen | H02J 7/0013 | |
| 2002/0041174 A1 * | 4/2002 | Purkey | H01M 50/247 | 320/103 |
| 2002/0140405 A1 * | 10/2002 | Malik | B60L 50/16 | 320/166 |
| 2003/0020334 A1 * | 1/2003 | Nozu | H02J 7/0016 | 307/109 |
| 2003/0169022 A1 * | 9/2003 | Turner | G06F 1/30 | 320/166 |
| 2003/0210017 A1 * | 11/2003 | Tsujii | H02J 7/0016 | 320/166 |
| 2004/0038087 A1 * | 2/2004 | Shiue | H01M 6/50 | 429/204 |
| 2004/0124811 A1 * | 7/2004 | Kok | B60R 16/03 | 320/167 |
| 2004/0228055 A1 * | 11/2004 | Pearson | H02J 7/345 | 361/93.1 |
| 2005/0110468 A1 * | 5/2005 | Turner | H02J 7/0013 | 320/166 |
| 2005/0139399 A1 * | 6/2005 | Gopal | H01M 8/0494 | 180/65.1 |
| 2006/0133007 A1 * | 6/2006 | Shiue | H02P 7/28 | 361/301.2 |
| 2007/0182248 A1 * | 8/2007 | Blaker | B60L 8/003 | 307/10.1 |
| 2008/0093138 A1 * | 4/2008 | Glonner | B60W 10/26 | 320/109 |
| 2008/0094042 A1 * | 4/2008 | Ferrario | H02J 7/00 | 323/234 |
| 2008/0136373 A1 * | 6/2008 | Lai | H02J 7/007182 | 320/128 |
| 2008/0278221 A1 * | 11/2008 | Rowland | H02J 7/345 | 327/536 |
| 2009/0112384 A1 * | 4/2009 | Jeon | H01M 8/04302 | 701/22 |
| 2009/0200991 A1 * | 8/2009 | Yoshida | B60L 53/11 | 320/162 |
| 2009/0222157 A1 * | 9/2009 | Kwon | B60W 20/13 | 701/22 |

(56) References Cited

U.S. PATENT DOCUMENTS

| | | | |
|---|---|---|---|
| 2010/0026248 A1* | 2/2010 | Barrade | H02J 7/342 320/166 |
| 2010/0116574 A1* | 5/2010 | Gilmore | B60K 6/485 320/167 |
| 2011/0025278 A1* | 2/2011 | Balakrishnan | H02M 1/32 320/166 |
| 2011/0241626 A1* | 10/2011 | McPherson | H02J 7/007188 320/155 |
| 2012/0104861 A1* | 5/2012 | Kojori | H02J 7/00 307/82 |
| 2012/0168242 A1* | 7/2012 | Kulatunga | B62M 6/25 180/210 |
| 2012/0300803 A1* | 11/2012 | Kangas | F41H 13/0087 372/34 |
| 2013/0082639 A1* | 4/2013 | O'Kane | H02J 7/0031 320/128 |
| 2013/0229144 A1* | 9/2013 | Nagata | H02J 7/00304 320/107 |
| 2014/0055101 A1* | 2/2014 | Ferrario | G03B 15/05 320/167 |
| 2014/0145550 A1* | 5/2014 | Hitchcock | H10N 30/30 310/300 |
| 2014/0232240 A1* | 8/2014 | Hitchcock | H02N 2/181 310/314 |
| 2014/0339902 A1* | 11/2014 | Sepe, Jr. | H02J 1/102 307/80 |
| 2015/0001926 A1* | 1/2015 | Kageyama | E05B 81/86 307/10.1 |
| 2015/0137605 A1* | 5/2015 | Spivey | H02J 9/061 307/66 |
| 2015/0300307 A1* | 10/2015 | Setterberg | H02J 7/1423 701/113 |
| 2016/0049819 A1* | 2/2016 | Butler | H02J 7/345 320/105 |
| 2016/0118902 A1* | 4/2016 | Huang | B60L 58/25 363/21.04 |
| 2016/0164311 A1* | 6/2016 | Nagata | H02J 7/00714 320/134 |
| 2016/0268058 A1 | 9/2016 | Postiglione | H01G 11/62 |
| 2016/0297311 A1* | 10/2016 | Butler | H01M 10/0525 |
| 2016/0298589 A1* | 10/2016 | Setterberg | H02J 7/1423 |
| 2016/0318418 A1* | 11/2016 | Tokushige | H01M 10/637 |
| 2017/0201120 A1* | 7/2017 | Lisini | H02J 7/0068 |
| 2017/0242465 A1* | 8/2017 | Kelly | G06F 1/26 |
| 2017/0279284 A1* | 9/2017 | Lim | H02J 7/0045 |
| 2017/0292997 A1* | 10/2017 | You | H01M 10/482 |
| 2017/0328329 A1* | 11/2017 | Buchanan | F02N 11/0866 |
| 2018/0154779 A1* | 6/2018 | Chol | B60L 1/00 |
| 2018/0166892 A1* | 6/2018 | Sepe, Jr. | H02J 7/007194 |
| 2018/0183257 A1* | 6/2018 | Minnickel | B25C 1/06 |
| 2019/0214845 A1* | 7/2019 | Hausman, Jr. | E06B 9/38 |
| 2019/0393702 A1* | 12/2019 | Su | H02J 7/00043 |
| 2020/0036208 A1* | 1/2020 | Minnickel | H01M 50/249 |
| 2020/0055472 A1* | 2/2020 | Kageyama | H02J 9/061 |
| 2020/0063705 A1* | 2/2020 | Isaranggulnaayudhya | F02N 11/0866 |
| 2020/0067333 A1* | 2/2020 | Wekwert | F02N 11/12 |
| 2020/0136414 A1* | 4/2020 | Patsos | H02J 7/342 |
| 2020/0161887 A1* | 5/2020 | Minnickel | B25C 1/06 |
| 2020/0395774 A1* | 12/2020 | Chen | H02J 7/0013 |
| 2021/0159720 A1* | 5/2021 | Yen | G11C 5/141 |
| 2021/0175025 A1* | 6/2021 | Zhou | H01M 10/052 |
| 2021/0336434 A1* | 10/2021 | Chen | H02H 7/20 |
| 2021/0380000 A1* | 12/2021 | Trivedi | B60L 3/0046 |
| 2022/0037906 A1* | 2/2022 | Minnickel | H01M 50/267 |
| 2022/0069695 A1* | 3/2022 | Sano | H02M 1/08 |
| 2022/0123581 A1* | 4/2022 | Clarke | H02J 7/0069 |
| 2022/0158475 A1* | 5/2022 | Wekwert | F02N 11/12 |
| 2022/0203844 A1* | 6/2022 | Sujan | H01M 16/003 |
| 2022/0238943 A1* | 7/2022 | Denysenko | H01M 50/249 |
| 2022/0334846 A1* | 10/2022 | Doi | G06F 1/26 |
| 2022/0337078 A1* | 10/2022 | Shao | H02M 3/07 |
| 2023/0170731 A1* | 6/2023 | Corser | H02J 7/0014 700/217 |
| 2023/0187954 A1* | 6/2023 | Cronin | H02J 7/345 307/10.1 |
| 2023/0211667 A1* | 7/2023 | Cronin | B60L 50/64 320/109 |
| 2023/0211674 A1* | 7/2023 | Cronin | H02J 3/322 320/103 |
| 2023/0211675 A1* | 7/2023 | Cronin | H02J 7/345 320/103 |
| 2023/0211677 A1* | 7/2023 | Cronin | B60L 58/20 307/10.1 |
| 2023/0211691 A1* | 7/2023 | Cronin | B60L 50/50 701/22 |
| 2023/0213593 A1* | 7/2023 | Cronin | G01R 31/64 324/548 |
| 2023/0216308 A1* | 7/2023 | Khan | H02J 7/34 320/108 |
| 2023/0216323 A1* | 7/2023 | Cronin | H02J 7/342 320/166 |
| 2023/0216330 A1* | 7/2023 | Cronin | H02J 7/342 320/166 |
| 2023/0216331 A1* | 7/2023 | Cronin | H02J 7/0068 700/291 |
| 2023/0223784 A1* | 7/2023 | Cronin | B60L 58/27 320/167 |
| 2023/0234472 A1* | 7/2023 | Cronin | H02J 7/345 701/22 |
| 2023/0241984 A1* | 8/2023 | Cronin | H02J 7/345 307/9.1 |
| 2023/0261506 A1* | 8/2023 | Huang | H02J 7/0047 307/10.6 |
| 2023/0261507 A1* | 8/2023 | Huang | H02J 7/34 307/10.6 |
| 2023/0301367 A1* | 9/2023 | Füglistaller | H02J 7/342 |
| 2023/0318340 A9* | 10/2023 | Shao | H02M 3/07 307/23 |
| 2023/0323847 A1* | 10/2023 | Clarke | H02J 7/0048 123/179.1 |
| 2023/0390907 A1* | 12/2023 | Minnickel | H02J 7/0068 |
| 2023/0397671 A1* | 12/2023 | Pilatowicz | H02J 7/342 |
| 2024/0075845 A1* | 3/2024 | Wekwert | H02J 7/34 |
| 2024/0171076 A1* | 5/2024 | Deutsch | H02M 1/0022 |
| 2024/0264295 A1* | 8/2024 | Bariant | G01S 7/52006 |
| 2024/0283281 A1* | 8/2024 | Clarke | H02J 7/00714 |
| 2024/0283286 A1* | 8/2024 | Cao | H02J 9/061 |
| 2024/0339851 A1* | 10/2024 | Liu | H02J 7/00304 |
| 2025/0050486 A1* | 2/2025 | Minnickel | H01M 50/213 |
| 2025/0105657 A1* | 3/2025 | Liu | H02J 9/002 |
| 2025/0128639 A1* | 4/2025 | Wekwert | H02J 7/342 |

* cited by examiner

SUPERCAPACITOR CONTROL CIRCUIT AND METHOD FOR INTELLIGENTLY IDENTIFYING STARTING MODE OF VEHICLE

CROSS-REFERENCE TO RELATED APPLICATIONS

This application is a continuation of PCT application serial no. PCT/CN2024/138833, filed on Dec. 12, 2024, which claims the priority and benefit of Chinese patent application serial no. 202411687198.5, filed on Nov. 25, 2024. The entireties of PCT application serial no. PCT/CN2024/138833 and Chinese patent application serial no. 202411687198.5 are hereby incorporated by reference herein and made a part of this specification.

FIELD OF THE INVENTION

The present application relates to a technical field of supercapacitor control circuits, and, in particular, to a supercapacitor control circuit and method for intelligently identifying a starting mode of a vehicle.

BACKGROUND OF THE INVENTION

At present, under low temperatures, frequent starts and stops, or prolonged periods of inactivity, the battery is prone to insufficient charge, making it unable to provide enough starting current, resulting in difficult or even failed engine starting. At the same time, the battery needs to provide high current to meet starting demands frequently, which accelerates aging of the battery and shortens lifespan of the battery. In order to solve the problem, existing technology has introduced supercapacitors as auxiliary power sources, leveraging their high charging speed and high instantaneous discharging capability to assist the battery in providing starting current. However, currents output cannot be adjusted automatically in traditional supercapacitor auxiliary systems based on different environmental and battery conditions during the starting, resulting in energy waste and poor system adaptability under varying temperatures and usage conditions. Therefore, there is an urgent need for a supercapacitor control circuit capable of intelligently identifying a starting mode and dynamically adjusting current based on environmental conditions, to improve system adaptability, prolong the lifespan of the battery, and serving as a reliable emergency power supply when the starting fails.

SUMMARY

In order to solve the problem that a battery in an existing starting system is difficult to provide enough current under low-temperature and frequent start-stop conditions, the present application provides a supercapacitor control circuit and method for intelligently identifying a starting mode of a vehicle.

A supercapacitor control circuit for intelligently identifying a starting mode of a vehicle includes a main control module, a supercapacitor bank, a charging control module, a discharging control module, a first voltage sampling module, a second voltage sampling module and an environmental information acquisition module, a power supply input terminal of the charging control module is connected to a power supply output terminal of a battery, a power supply output terminal of the charging control module is connected to a power supply input terminal of the supercapacitor bank, an enable signal input terminal of the charging control module is connected to a first enable signal output terminal of the main control module, a power supply output terminal of the supercapacitor bank is connected to a power supply input terminal of the discharging control module, a power supply output terminal of the discharging control module is connected in parallel to the power supply output terminal of the battery for providing an instantaneous current required by the vehicle, an enable signal input terminal of the discharging control module is connected to a second enable signal output terminal of the main control module, a parallel connection point formed between the power supply output terminal of the discharging control module and the power supply output terminal of the battery is connected to a signal input terminal of the first voltage sampling module, a signal output terminal of the first voltage sampling module is connected to a first sampled signal input terminal of the main control module, a common node between the power supply output terminal of the battery and the power supply input terminal of the charging control module is connected to a first signal input terminal of the second voltage sampling module, a common node between the power supply output terminal of the supercapacitor bank and the power supply input terminal of the discharging control module is connected to a second signal input terminal of the second voltage sampling module, a signal output terminal of the second voltage sampling module is connected to a second sampled signal input terminal of the main control module, the environmental information acquisition module is configured to acquire environmental information of the vehicle, a signal output terminal of the environmental information acquisition module is connected to a third sampled signal input terminal of the main control module, and the main control module is used to configure discharge enable signals of different duty ratios according to the environmental information and output the discharge enable signals to the discharging control module to adjust a magnitude of an auxiliary current output by the supercapacitor bank.

According to the above technical solution, accurate charging and discharging management of the super capacitor is realized through the cooperative effect of dynamic signal control of the main control module and various sampling modules. Specifically, the control circuit includes the first voltage sampling module and the second voltage sampling module which are respectively configured for monitoring the voltage states of the battery and the supercapacitor bank, ensuring that proper current support is provided during starting. The environment information acquisition module is configured for acquiring information of environmental conditions such as external temperature and start-stop frequency of the vehicle and transmitting the information to the main control module, and the main control module generates discharge enable signals with different duty ratios according to the environmental conditions to control operation states of the discharging control module. According to the technical solution, the output current of the supercapacitor bank is adjusted, so that different environment and operation condition requirements are effectively satisfied, which improves the adaptability of the system under extreme conditions such as low temperature or frequent starting and stopping, prolongs the service life of the battery, provides emergency starting support in specific occasions, and enhances the intelligent adjusting capability.

Optionally, the supercapacitor bank includes a plurality of supercapacitors sequentially connected in series, each of the plurality of supercapacitors is related for a withstand voltage of 3V, and is connected in parallel with a voltage-equalizing resistor.

Optionally, the charging control module includes an input filter unit, an MOS transistor MN9, an MOS transistor MN10, an MOS transistor MN11, an MOS transistor MN12, an MOS transistor MN13, a control chip U7 and a bidirectional protection diode D26, a power supply input terminal of the input filter unit is connected to the power supply output terminal of the battery, a power supply output terminal of the input filter unit is connected to a first conduction terminal of the MOS transistor MN9, a second conduction terminal of the MOS transistor MN9 is connected to a first conduction terminal of the MOS transistor MN11, a second conduction terminal of the MOS transistor MN11 is grounded; the MOS transistor MN12 is connected between a common node between the second conduction terminal of the MOS transistor MN9 and the first conduction terminal of the MOS transistor MN11 and ground, the common node between the second conduction terminal of the MOS transistor MN9 and the first conduction terminal of the MOS transistor MN11 is connected to a first conduction terminal of the MOS transistor MN10, a second conduction terminal of the MOS transistor MN10 is connected to a first conduction terminal of the MOS transistor MN13, a second conduction terminal of the MOS transistor MN13 is connected to a positive terminal of the bidirectional protection diode D26, a negative terminal of the bidirectional protection diode D26 is connected to the power supply input terminal of the supercapacitor bank, a common node between the power supply output terminal of the input filter unit and the first conduction terminal of the MOS transistor MN9 is connected to a first signal acquisition terminal of the control chip U7, a common node between the second conduction terminal of the MOS transistor MN13 and the positive terminal of the bidirectional protection diode D26 is connected to a second signal acquisition terminal of the control chip U7, and each of the MOS transistor MN9, the MOS transistor MN10, the MOS transistor MN11, the MOS transistor MN12 and the MOS transistor MN13 has a controlled terminal connected to the control chip U7.

According to the above technical solution, efficient current control and reverse protection functions are realized, a stable charging process for the supercapacitors may be maintained when the voltage of the battery changes, which avoids low charging efficiency or potential safety hazards caused by voltage fluctuation, and thus improving the charging efficiency and the overall safety of the system.

Optionally, the discharging control module includes a MOS transistor MN3, a MOS transistor MN4, a triode Q1, a triode Q2, a diode D23 and a diode D4, a first conduction terminal of the MOS transistor MN4 is connected to the power supply output terminal of the supercapacitor bank, a second conduction terminal of the MOS transistor MN4 is connected to a first conduction terminal of the MOS transistor MN3, a second conduction terminal of the MOS transistor MN3 is configured to output the auxiliary current, the second enable signal output terminal of the main control module is connected to a positive terminal of the diode D4, a negative terminal of the diode D4 is connected to a positive terminal of the diode D23, a common node between a controlled terminal of the MOS transistor MN3 and ground is connected to a negative terminal of the diode D23, a common node between a controlled terminal of the MOS transistor MN4 and a first conduction terminal of the triode Q1 is connected to the negative terminal of the diode D23, a second conduction terminal of the triode Q1 is grounded, the triode Q2 is connected between the controlled terminal of the triode Q1 and the ground, a controlled terminal of the triode Q2 is connected to the second enable signal output terminal of the main control module, and a common node between the negative terminal of the diode D4 and the positive terminal of the diode D23 is connected to the controlled terminal of the triode Q2.

According to the above technical solution, a high-precision control and a rapid response to the discharge process are realized, a high current may be immediately supplemented for the battery when the vehicle is started. Additionally, the discharge loop is closed in the non-starting state, so unnecessary power consumption is avoided, and thus the discharge efficiency of the circuit and the energy conservation of the system are effectively improved.

Optionally, the first voltage sampling module includes a resistor R56, a resistor R63, a resistor R60 and a diode D19, the parallel connection point formed between the power supply output terminal of the discharging control module and the power supply output terminal of the battery is connected to a first terminal of the resistor R56, a second terminal of the resistor R56 is connected to a first terminal of the resistor R63, a second terminal of the resistor R63 is grounded, a common node between the second terminal of the resistor R56 and the first terminal of the resistor R63 is connected to a first terminal of the resistor R60, a second terminal of the resistor R60 is connected to a pin 3 of the diode D19, a pin 2 of the diode D19 is connected to a power supply, a pin 1 of the diode D19 is grounded, and a common node between the second terminal of the resistor R60 and the pin 3 of the diode D19 is connected to a test point T2.

Optionally, the second voltage sampling module includes a resistor R49, a resistor R51, a resistor R50, a resistor R80 and a diode D16, the common node between the power supply output terminal of the supercapacitor bank and the power supply input terminal of the discharging control module is connected to a first terminal of the resistor R49, a second terminal of the resistor R49 is connected to a first terminal of the resistor R51, a second terminal of the resistor R51 is grounded, a common node between the second terminal of the resistor R49 and the first terminal of the resistor R51 is connected to a first terminal of the resistor R50, the common node between the power supply output terminal of the battery and the power supply input terminal of the charging control module is connected to a first terminal of the resistor R80, a common node between a second terminal of the resistor R80 and ground is connected to the first terminal of the resistor R50, a second terminal of the resistor R50 is connected to a pin 3 of the diode D16, a pin 2 of the diode D16 is connected to a power supply, a pin 1 of the diode D16 is grounded, and a common node between the second terminal of the resistor R50 and the pin 3 of the diode D16 is connected to a test point T1.

Optionally, the environmental information acquisition module includes a temperature sensing unit and a vibration sensing unit, the temperature sensing unit includes a thermistor RT1, a first terminal of the thermistor RT1 is grounded, a second terminal of the thermistor RT1 is connected to the third sampled signal input terminal of the main control module, the vibration sensing unit includes a resistor R67, a resistor R68 and a vibration sensing element K1, a first terminal of the resistor R67 is connected to a power supply, a second terminal of the resistor R67 is connected to a first terminal of the vibration sensing element K1, a second terminal of the vibration sensing element K1 is grounded, a common node between the second terminal of the resistor R67 and the first terminal of the vibration sensing element K1 is connected to a first terminal of the resistor R68, and a second terminal of the resistor R68 is connected to the third sampled signal input terminal of the main control module.

Optionally, the supercapacitor control circuit for intelligently identifying the starting mode of the vehicle further includes a DC-DC power supply module, the DC-DC power supply module includes a buck conversion chip U4, a voltage regulator chip U5 and a resistor R72, the power supply output terminal of the battery is connected to a power supply input terminal of the buck conversion chip U4, a power supply output terminal of the buck conversion chip U4 is connected to a first terminal of the resistor R72, a second terminal of the resistor R72 is configured to output a voltage of 4.2V and is connected to a power supply input terminal of the voltage regulator chip U5, and a power supply output terminal of the voltage regulator chip U5 is configured to output a voltage of 3V.

A control method based on the supercapacitor control circuit for intelligently identifying the starting mode of the vehicle includes:
- acquiring a current voltage level of the supercapacitor bank;
- determining, whether the current voltage level is lower than a preset voltage
- threshold, controlling the battery to supply power to the supercapacitor bank in response to that the current voltage level is lower than the preset voltage threshold until the current voltage level is not lower than the preset voltage threshold, and then controlling the battery to stop supplying power to the supercapacitor bank;
- performing sampling at a plurality of voltage points continuously based on a determined sampling period in response to that the current voltage level is not lower than the preset voltage threshold, to determine voltage change rates at the plurality of voltage points;
    - acquiring environmental information in response to that the voltage change rates satisfy preset starting condition parameters, and analyzing the environmental information to determine corresponding auxiliary current output parameters used to determine a magnitude of the auxiliary current output by the supercapacitor bank.

By adopting the technical scheme, the charging process may be automatically started when the voltage of the supercapacitor is lower than the threshold value, charging is automatically stopped after the preset voltage is reached, to effectively prevent the overcharging phenomenon; when the starting condition is met, the starting current is output, the magnitude of the auxiliary current is dynamically adjusted, the starting success rate is ensured, so as to prolong the service life of the storage battery, and thus improving the intelligent control effect and adaptability of the system.

Optionally, the analyzing the environmental information to determine the corresponding auxiliary current output parameters includes:
- extracting at least a current temperature of the vehicle, a starting frequency of the vehicle and a battery state of the vehicle in the environmental information;
- based on an established local database, matching a temperature weight coefficient and a preset temperature threshold interval for the current temperature of the vehicle, matching a frequency weight coefficient and a preset frequency threshold interval for the starting frequency of the vehicle, and matching a battery state weight coefficient and a preset battery state threshold interval for the battery state of the vehicle;
- comparing and analyzing the current temperature of the vehicle and the preset temperature threshold interval to generate a corresponding first correlation value;
- comparing and analyzing the starting frequency of the vehicle and the preset frequency threshold interval to generate a corresponding second correlation value;
- comparing and analyzing the battery state of the vehicle and the preset battery state threshold interval to generate a corresponding third correlation value;
- adding a product of the first correlation value and the temperature weight coefficient, a product of the second correlation value and the frequency weight coefficient, and a product of the third correlation value and the battery state weight coefficient to generate a corresponding auxiliary current level;
- determining the corresponding auxiliary current output parameters according to the auxiliary current level, establishing a memory information set associated with the current temperature of the vehicle, the starting frequency of the vehicle and the battery state of the vehicle, establishing a mapping relationship between the memory information set and the auxiliary current output parameters, and storing the memory information set and the mapping relationship into a memory database.

DETAILED DESCRIPTION

The present application will be further described in detail in conjunction with the accompanying drawings.

Figure 1:
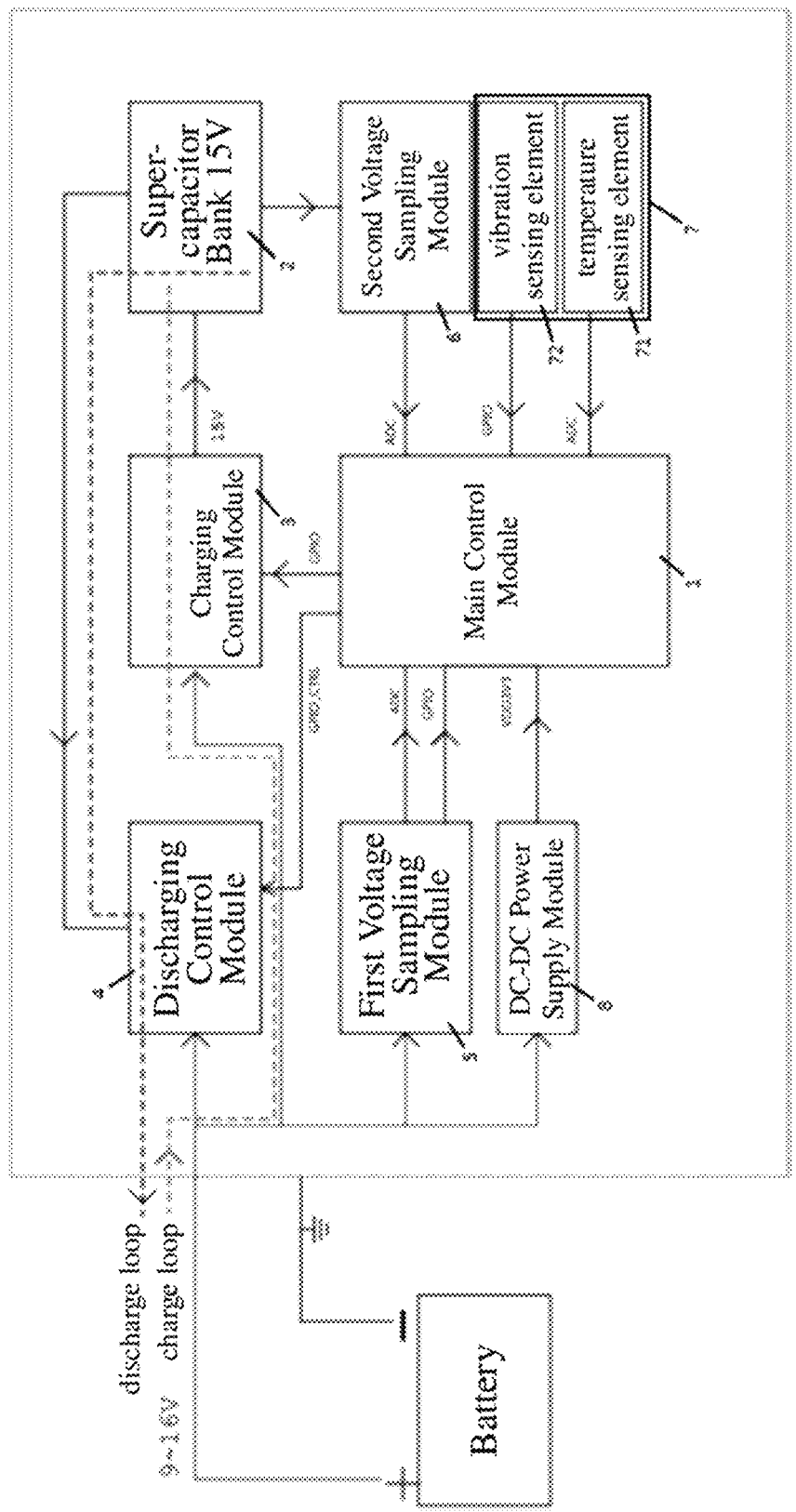
FIG. 1 is a flowchart of a supercapacitor control circuit for intelligently identifying a starting mode of a vehicle according to an embodiment of the present application.

In an embodiment, as shown in FIG. 1, the present application discloses a supercapacitor control circuit for intelligently identifying a starting mode of a vehicle, which specifically includes a main control module 1, a supercapacitor bank 2, a charging control module 3, a discharging control module 4, a first voltage sampling module 5, a second voltage sampling module 6 and an environmental information acquisition module 7. The charging control module 3 has a power supply input terminal connected to a power supply output terminal of a battery, and a power supply output terminal connected to a power supply input terminal of the supercapacitor bank 2. The charging control module 3 has an enable signal input terminal connected to a first enable signal output terminal of the main control module 1. The supercapacitor bank 2 has a power supply output terminal connected to a power supply input terminal of the discharging control module 4. The discharging control module 4 has a power supply output terminal connected in parallel to the power supply output terminal of the battery to provide an instantaneous current required by the vehicle. The discharging control module 4 has an enable signal input terminal connected to a second enable signal output terminal of the main control module 1. A parallel connection point formed between the power supply output terminal of the discharging control module 4 and the power supply output terminal of the battery is connected to a signal input terminal of the first voltage sampling module 5. The first voltage sampling module 5 has a signal output terminal connected to a first sampled signal input terminal of the main control module 1. A common node between the power supply output terminal of the battery and the power supply input terminal of the charging control module 3 is connected to a first signal input terminal of the second voltage sampling module 6, and a common node between the power supply output terminal of the supercapacitor bank 2 and the power supply input terminal of the discharging control module 4 is connected to a second signal input terminal of the second voltage sampling module 6. The second voltage sampling module 6 has a signal output terminal connected to a second sampled signal input terminal of the main control module 1. The environmental information acquisition module 7 is configured to acquire environmental information of a vehicle, and the environmental information acquisition module 7 has a signal output terminal connected to a third sampled signal input terminal of the main control module 1. The main control module 1 is used to configure discharge enable signals with different duty ratios according to the environmental information, and output the discharge enable signals to the discharging control module 4 to adjust a magnitude of an auxiliary current output by the supercapacitor bank 2.

In this embodiment, the supercapacitor control circuit for intelligently identifying the starting mode of the vehicle realizes dynamic charging and discharging management of supercapacitors 21 through close cooperation among the main control module 1, the supercapacitor bank 2, the charging control module 3, the discharging control module 4, the first voltage sampling module 5, the second voltage sampling module 6 and the environmental information sampling module 7, so as to provide instantaneous high current required for the starting of the vehicle. The power supply input terminal of the charging control module 3 is connected to the power supply output terminal of the battery, so as to ensure that power may be directly supplied to the supercapacitor bank 2 when the battery is in a charging state. The power supply output terminal of the charging control module 3 is connected to the power supply input terminal of the supercapacitor bank 2, and the enable signal input terminal of the charging control module 3 receives a control signal from the first enable signal output terminal of the main control module 1, thereby controlling the charging process, so that the supercapacitor bank 2 is charged when needed. The power supply output terminal of the supercapacitor bank 2 is connected to the power supply input terminal of the discharging control module 4, and the power supply output terminal of the discharging control module 4 is connected in parallel to the power supply output terminal of the battery, so that the supercapacitors 21 and the battery may jointly output the instantaneous high current required for starting when it is necessary to start. The enable signal input terminal of the discharging control module 4 is connected to the second enable signal output terminal of the main control module 1, thereby receiving a discharging control signal transmitted by the main control module 1, so as to open a discharge path of the supercapacitors 21 when the vehicle starts. The parallel connection point is formed at the power supply output terminal of the discharging control module 4 and the power supply output terminal of the battery, and connected to the signal input terminal of the first voltage sampling module 5, so that an overall output voltage after the battery and the supercapacitor bank 2 are connected in parallel may be sampled. The signal output terminal of the first voltage sampling module 5 is connected to the first sampled signal input terminal of the main control module 1, and transmits collected voltage information to the main control module 1 for monitoring the parallel connected voltage of the battery and the supercapacitors 21 in real time. The common node between the power supply output terminal of the battery and the power supply input terminal of the charging control module 3 is connected to the first signal input terminal of the second voltage sampling module 6, and the common node between the power supply output terminal of the supercapacitor bank 2 and the power supply input terminal of the discharging control module 4 is connected to the second signal input terminal of the second voltage sampling module 6, so as to ensure that the second voltage sampling module 6 may simultaneously collect voltage differences between the battery and the supercapacitors 21, and provide accurate voltage data for the main control module 1. The signal output terminal of the second voltage sampling module 6 is connected to the second sampled signal input terminal of the main control module 1 to feed back the collected voltage information to the main control module 1 for reference during charging and discharging control. The environmental information acquisition module 7 is configured for collecting information such as temperature and vibration of the vehicle environment, and the signal output terminal thereof is connected to the third sampled signal input terminal of the main control module 1 to assist the main control module 1 to adjust a starting strategy according to the external environmental information. The main control module 1 configures the discharge enable signals with different duty ratios based on the environmental information and the voltage data, outputs the discharge enable signals to the discharging control module 4, and adapts to different vehicle starting requirements by changing discharge currents of the supercapacitors 21, so that the system may achieve optimal charge and discharge control according to actual conditions.

Figure 10:
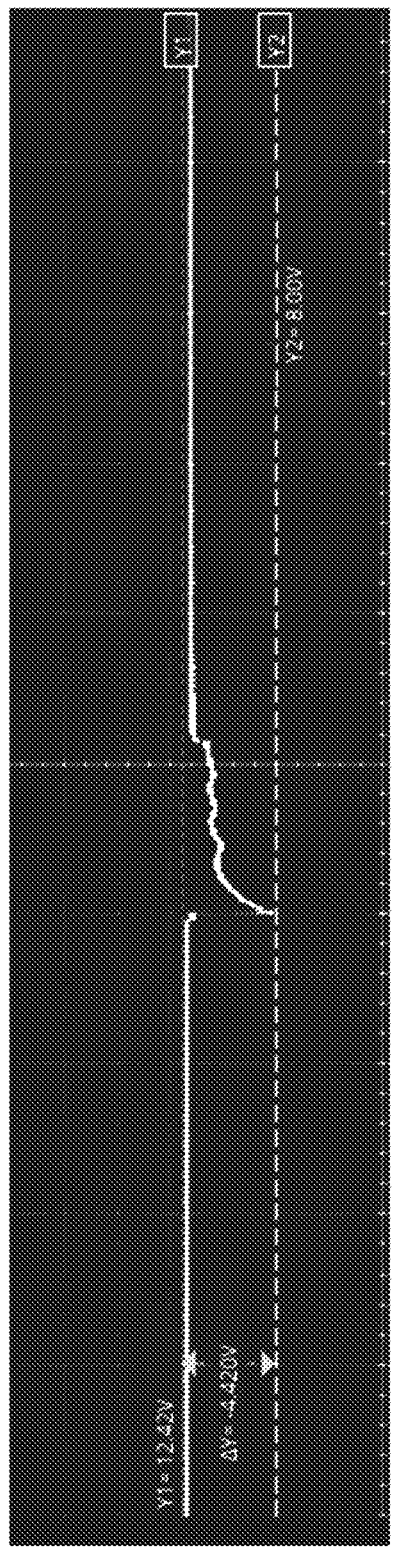
FIG. 10 is a waveform diagram of a starting voltage of a vehicle during starting according to an embodiment of the present application.

Specifically, as shown in FIG. 10, when an engine starts, a current of 300-800 A is generated instantaneously, causing an instantaneous drop in a voltage waveform of the battery. In addition, other electrical devices in the vehicle are insufficient to instantaneously pull down the voltage of the battery, which helps to determine that the engine is currently starting.

Vehicles may include, but are not limited to, cars, commercial vehicles, SUVs, vans, trucks, heavy trucks, military vehicles, special vehicles. For a car with a rated voltage of 12V, the battery voltage output by the battery is 9V~ 16V; and for a truck with a rated voltage of 24V, the battery voltage output by the battery is 18V~ 32V. At this time, the voltage of the supercapacitors in the car with the rated voltage of 12V is fully charged at 15V, and the voltage of the supercapacitors in the truck with the rated voltage of 24V is fully charged at 30V. In addition, 5 supercapacitors are used for the car with the rated voltage of 12V, 10 supercapacitors are used for the truck with the rated voltage of 24V. As well as, one 12V battery is used for the car with the rated voltage of 12V, two 12V batteries connected in series are used for the truck with the rated voltage of 24V, and the principles are the same. Here, only the case of the car with the rated voltage of 12V is described, and the truck with the rated voltage of 24V is not repeated.

In summary, accurate charging and discharging management of the supercapacitors 21 is realized through the cooperation of the dynamic signal control of the main control module 1 and various sampling modules. Specifically, the control circuit includes the first voltage sampling module 5 and the second voltage sampling module 6, which are respectively configured to monitor voltage states of the battery and the supercapacitor bank 2 to ensure appropriate current support is provided at startup. The environmental information acquisition module 7 is configured for collecting environmental condition information such as external temperature and start-stop frequency of the vehicle and transmitting the information to the main control module 1. The main control module 1 generates discharge enable signals with different duty ratios according to environmental conditions to control operation states of the discharging control module 4. According to the technical means, the output current of the supercapacitor bank 2 is adjusted, so that different environmental and operational requirements are effectively adapted. The adaptability of the system under extreme conditions such as low temperature or frequent start-stop cycles is improved, the service life of the battery is prolonged, emergency starting support is provided in specific occasions, demonstrating enhanced intelligent regulation capabilities.

Figure 2:
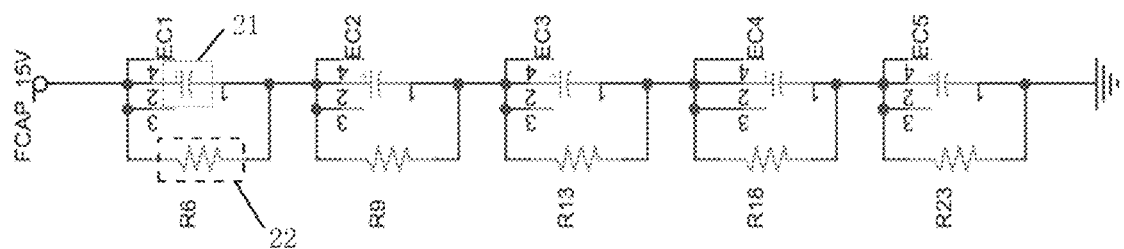
FIG. 2 is a schematic diagram of a partial circuit structure of a supercapacitor bank in the supercapacitor control circuit for intelligently identifying a starting mode of a vehicle according to an embodiment of the present application.

Further, as shown in FIG. 2, the supercapacitor bank 2 includes a plurality of supercapacitors 21 sequentially connected in series, each of the supercapacitors 21 is related for a withstand voltage of 3V, and is connected in parallel with a voltage-equalizing resistor 22.

In the supercapacitor control circuit for intelligently identifying the starting mode of the vehicle according to this embodiment, the supercapacitor bank 2 is formed by sequentially connecting a plurality of supercapacitors 21 in series, each of the supercapacitors 21 is rated for a withstand voltage of 3V, and a voltage-equalizing resistor 22 is connected in parallel to each of the supercapacitors 21. This design ensures that the voltage of the whole supercapacitor bank 2 may reach a sum of the plurality of capacitors connected in series, so as to meet the high-voltage demand. It guarantees safe use under high voltage conditions while also meeting the instantaneous high current output demand during the starting of the vehicle. The presence of each voltage-equalizing resistor 22 effectively balances the voltage distribution across each of the supercapacitors 21 connected in series, preventing individual supercapacitors 21 from being damaged due to excessive voltage deviation, thereby ensuring uniformity and durability of the entire capacitor bank. Each of the supercapacitors 21 connected in series has terminals connected in series with terminals of adjacent capacitors on one hand, and on the other hand, the voltage is uniformly distributed through the voltage-equalizing resistor 22 connected in parallel. Through this series design, the supercapacitor bank 2 may accumulate withstand voltage values of a plurality of single capacitors to form a high-voltage capacitor bank, and each of the voltage-equalizing resistors 22 connected in parallel to corresponding one of the supercapacitors 21 realizes uniform distribution of voltages among the capacitors, avoiding local overvoltage phenomenon caused by uneven voltage distribution during charging and discharging, thereby ensuring stability of the system and normal operation of each capacitor. When the charging control module 3 charges the supercapacitor bank 2, current flows through the plurality of supercapacitors 21 connected in series to charge them one by one, and each capacitor obtains a balanced charging voltage through the voltage-equalizing resistor 22 connected in parallel. However, when the discharging control module 4 is in operation, the supercapacitor bank 2 outputs current as a whole, ensuring that the instantaneous high current requirement is satisfied during startup, while also protecting the battery and prolonging the service life of the battery.

Further, the plurality of supercapacitors 21 connected in series may have unbalanced voltages due to the slightly different characteristics of each capacitor. The voltage-equalizing resistor 22 is connected in parallel at two ends of each supercapacitor 21, which ensures that the voltage across each capacitor is kept at a similar level, and prevents some capacitors from being overcharged or damaged due to excessive voltage. In the charging and discharging process, the voltage-equalizing resistors 22 may prevent excessive voltage deviation, protecting the lifespan and safety of the supercapacitors 21. Especially in an array of supercapacitors 21 operating at a high voltage, the voltage may be distributed uniformly through the voltage-equalizing resistors 22, so that individual capacitors may be prevented from bearing an excessively high voltage. These voltage-equalizing resistors 22 may generate slight leakage currents, so as to balance the voltage differences across respective capacitors. Generally, the resistance of the voltage-equalizing resistor 22 is selected to be relatively large, so as to avoid additional power loss while achieving the voltage-equalizing effect.

In summary, the voltage endurance may be enhanced through the structure of a plurality of supercapacitors 21 connected in series, and the voltage balance among the supercapacitors 21 is realized through the voltage-equalizing resistors 22, so that overload failure of individual capacitors due to uneven voltage is prevented, the stability and the service life of the supercapacitors 21 are improved, and reliable starting current support is ensured to be provided for the vehicle over the long term.

Further, as shown in FIGS. 3A-3D, the charging control module 3 includes an input filter unit, a MOS transistor MN9, a MOS transistor MN10, a MOS transistor MN11, a MOS transistor MN12, a MOS transistor MN13, a control chip U7 and a bidirectional protection diode D26. The input filter unit has a power supply input terminal connected to the power supply output terminal of the battery, and a power supply output terminal connected to a first conduction terminal of the MOS transistor MN9, a second conduction terminal of the MOS transistor MN9 is connected to a first conduction terminal of the MOS transistor MN11, and a second conduction terminal of the MOS transistor MN11 is grounded. The MOS transistor MN12 is connected between a common node between the second conduction terminal of the MOS transistor MN9 and the first conduction terminal of the MOS transistor MN11 and ground, and the common node between the second conduction terminal of the MOS transistor MN9 and the first conduction terminal of the MOS transistor MN11 is connected to a first conduction terminal of the MOS transistor MN10. A second conduction terminal of the MOS transistor MN10 is connected to a first conduction terminal of the MOS transistor MN13, a second conduction terminal of the MOS transistor MN13 is connected to a positive terminal of the bidirectional protection diode D26, a negative terminal of the bidirectional protection diode D26 is connected with the power supply input terminal of the supercapacitor bank 2. A common node between the power supply output terminal of the input filter unit and the first conduction terminal of the MOS transistor MN9 is connected to a first signal acquisition terminal of the control chip U7, and a common node between the second conduction terminal of the MOS transistor MN13 and the positive terminal of the bidirectional protection diode D26 is connected to a second signal acquisition terminal of the control chip U7. Each of the MOS transistor MN9, the MOS transistor MN10, the MOS transistor MN11, the MOS transistor MN12 and the MOS transistor MN13 has a controlled terminal connected to the control chip U7.

Figure 3A:
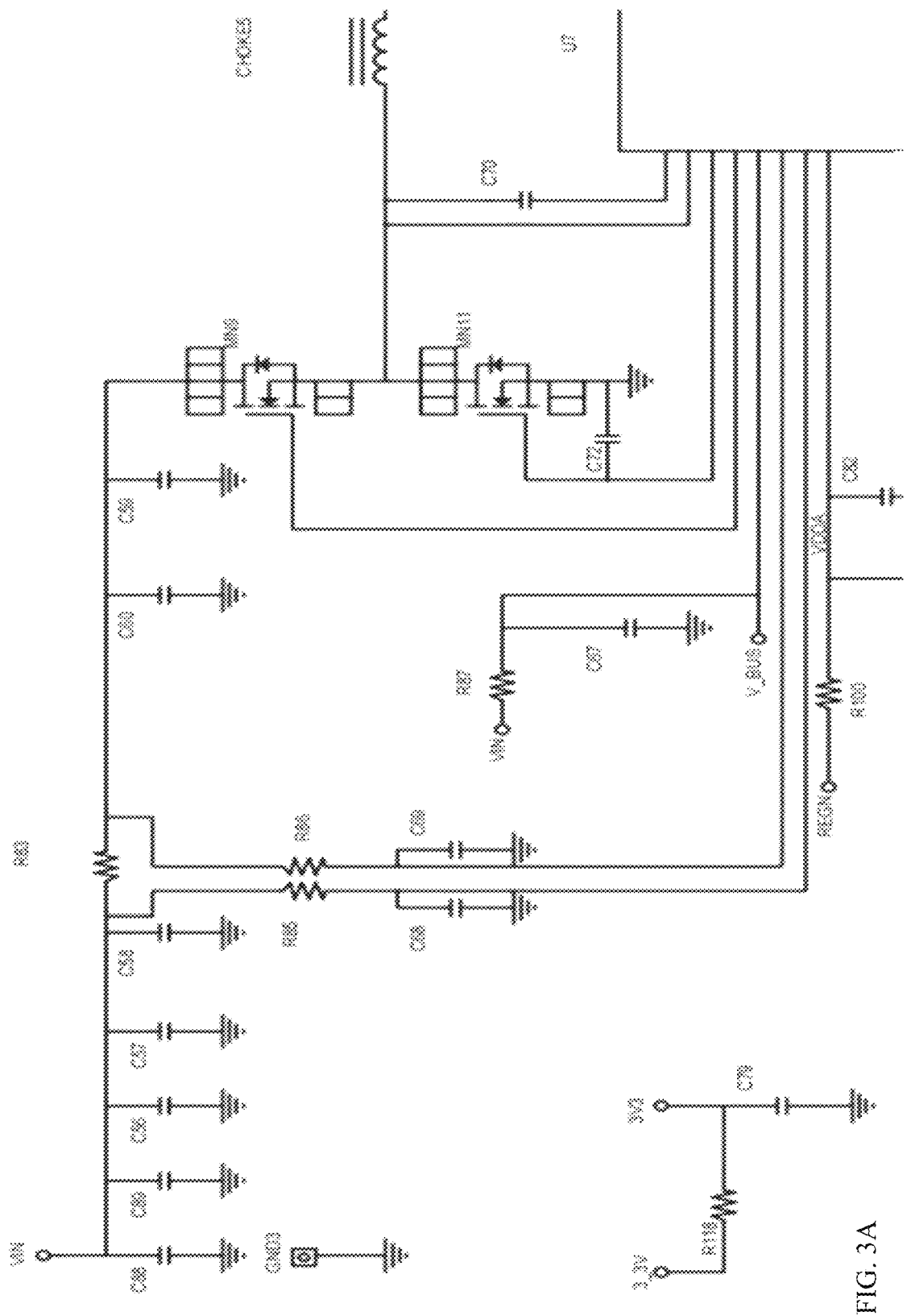
FIG. 3A is a schematic diagram of a first partial circuit structure of a charging control module in the supercapacitor control circuit for intelligently identifying a starting mode of a vehicle according to an embodiment of the present application.
Figure 3B:
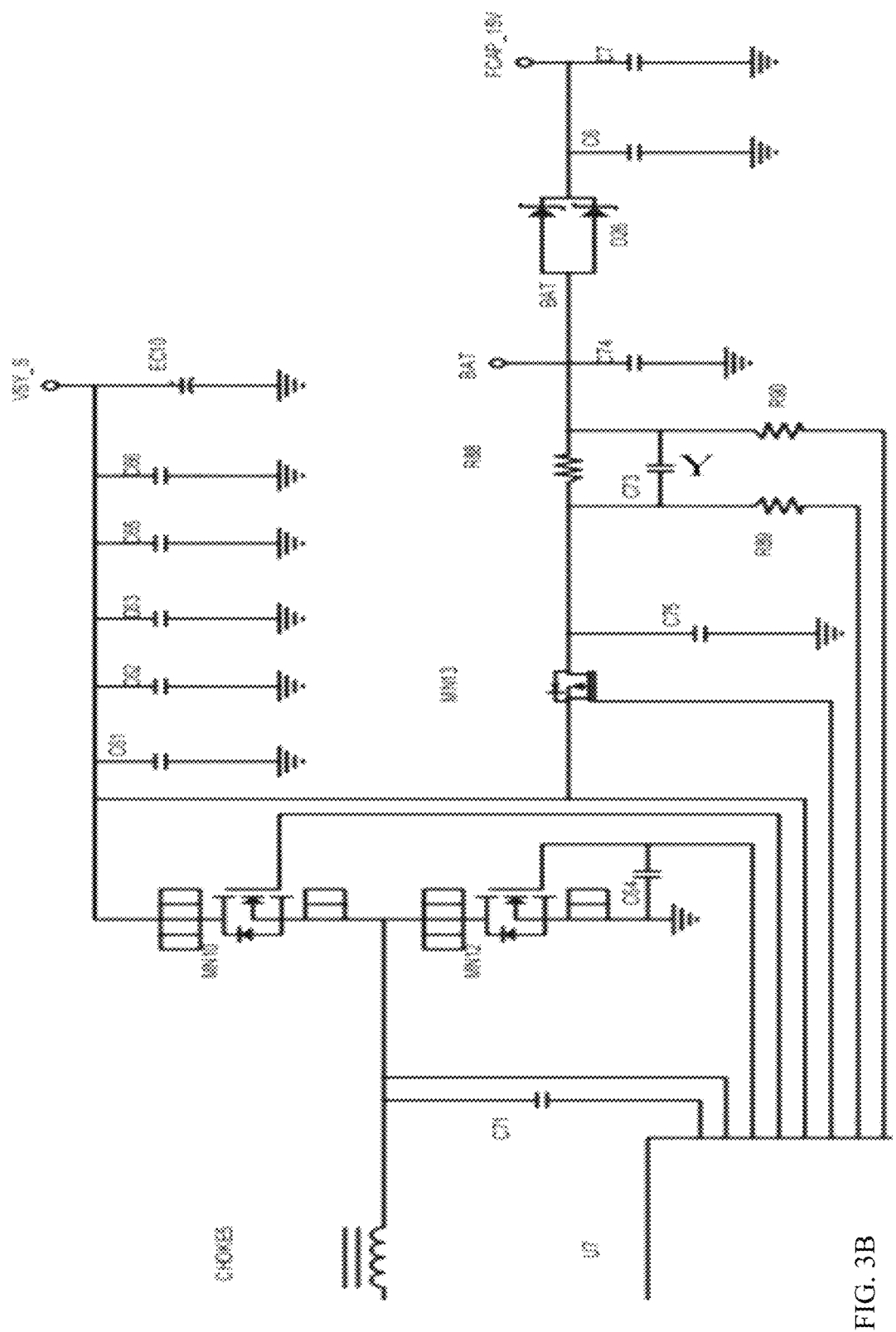
FIG. 3B is a schematic diagram of a second partial circuit structure of the charging control module in the supercapacitor control circuit for intelligently identifying the starting mode of the vehicle according to an embodiment of the present application.
Figure 3C:
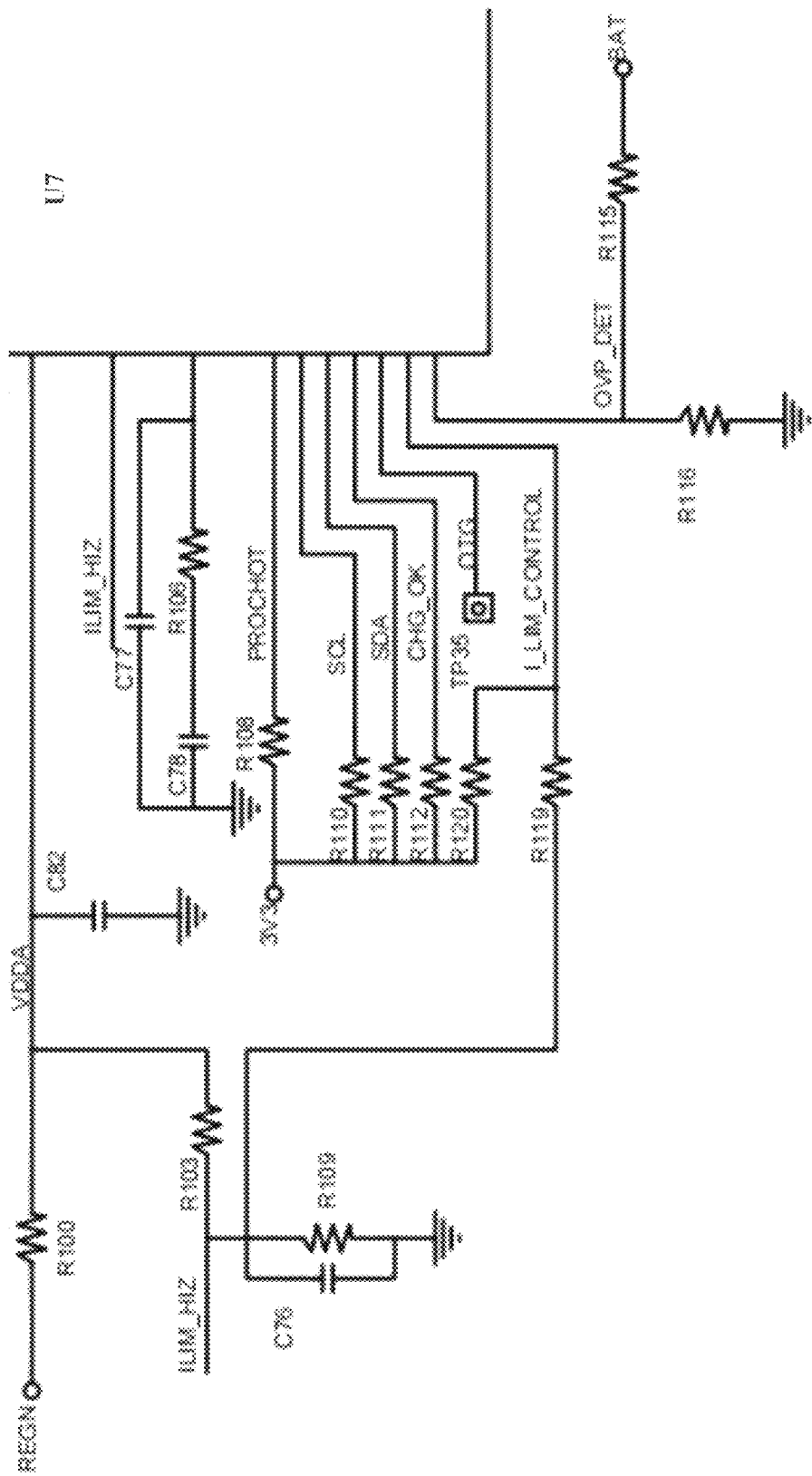
FIG. 3C is a schematic diagram of a third partial circuit structure of the charging control module in the supercapacitor control circuit for intelligently identifying the starting mode of the vehicle according to an embodiment of the present application.
Figure 3D:
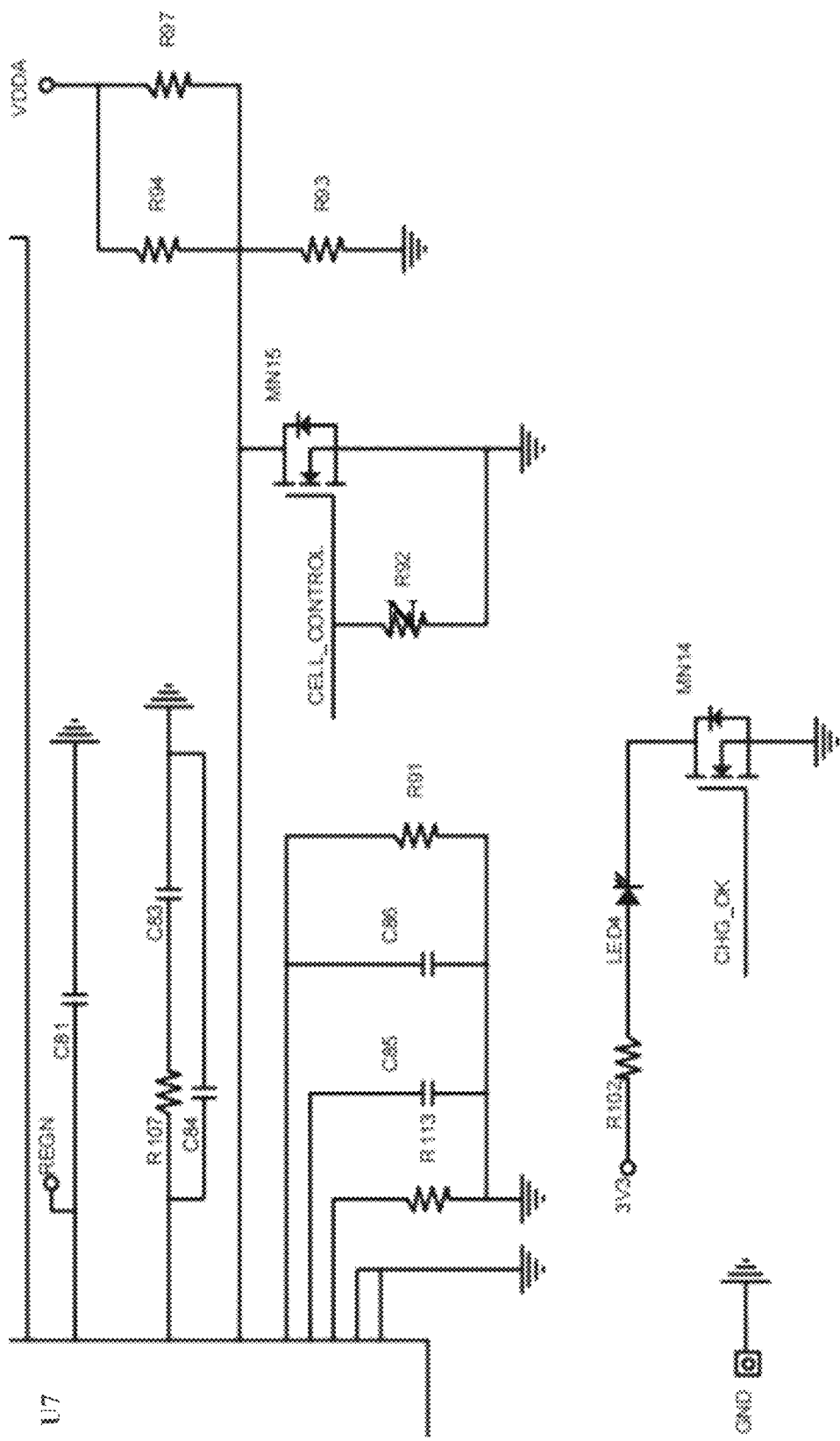
FIG. 3D is a schematic diagram of a fourth partial circuit structure of the charging control module in the supercapacitor control circuit for intelligently identifying the starting mode of the vehicle according to an embodiment of the present application.

In this embodiment, the input filter unit includes C88, C89, C56, C57 and C58 in FIG. 3A, which are used to filter the supply voltage of the battery. In this design, the BATDRV pin of the control chip U7 controls the switching state of the MOS transistor MN13, thereby disconnecting the power supply when the battery (or the supercapacitors 21) is fully charged to prevent overcharging. When the control chip U7 detects that the voltage of the battery reaches a set full threshold, the BATDRV outputs a signal to turn off the MN13, so that the battery stops charging, and the safety and life of the battery are protected. Additionally, the MOS transistor MN9, the MOS transistor MN10, the MOS transistor MN11 and the MOS transistor MN12 form a full-bridge driving circuit, which realizes the buck-boost DCDC conversion in cooperation with the intermediate inductor Choke 5. The full-bridge structure may flexibly regulate voltage and current in different operation modes, provides different required voltage levels for a load, and ensures the operation stability and efficiency of the system in various conditions.

Meanwhile, in the boost mode, the control chip U7 controls the MN9 and MN12 to be turned on while the MN10 and MN11 to be turned off, allowing current to flow through Choke5 to store energy and the output voltage to gradually increase; and in the buck mode, the control chip U7 controls the MN10 and MN11 to be turned on while the MN9 and MN12 to be turned off, and the inductor Choke5 releases the stored energy to reduce the output voltage. This method not only allows for flexible voltage conversion but also effectively controls energy transfer, ensuring a stable output voltage to meet load requirements. When the supercapacitors 21 need to be charged, the control chip U7 controls the full-bridge circuit to enter the boost or buck mode to match the current voltage state of the supercapacitors 21. By adjusting the on-off states of the MN9, the MN10, the MN11 and the MN12, the full-bridge circuit may automatically adapt to the voltage change of the supercapacitors 21, thereby achieving an efficient charging process. In the discharging process, the control chip U7 controls the output voltage and current of the full-bridge circuit according to the load requirement, so that the supercapacitors 21 may provide a stable voltage during discharging, and the instantaneous current requirements in different starting modes are satisfied. The control chip U7 may monitor the feedback from the voltage sampling module in real time, dynamically adjust the switching state of the MOS transistors in the full-bridge circuit, and ensure that the output of the system satisfies the voltage and current requirements under different operation conditions. The control chip U7 may realize fine control of the output voltage by adjusting the on-off times (duty ratios) of the MN9, the MN10, the MN11 and the MN12, so as to avoid overshoot or undervoltage. Under abnormal conditions (such as short circuit, overload, etc.), the control chip U7 may also promptly turn off the corresponding MOS transistors, cutting off the current path and protecting key components in the circuit from damage. The control chip U7 controls the conduction duty ratio of the MOS transistor through PWM modulation, thereby adjusting the output voltage and current of the full-bridge circuit. For example, when a high current is required during startup, the PWM duty ratio may be increased to extend on-time of the MOS transistor, providing a higher output current. However, in a low-load or static mode, the duty ratio may be reduced to lower the output current, thereby saving energy. This PWM control mode ensures that the supercapacitors 21 may provide appropriate current for the load under various starting conditions, thereby satisfying power requirements in different environments. According to changes in the load demand, the control chip U7 may control the full-bridge driving circuit to switch between different modes such as a boost mode, a bust mode and a constant voltage/current mode. In the boost mode, the output voltage may be increased in the case of insufficient battery voltage, ensuring that the supercapacitors 21 may be charged to a sufficient voltage level. When a lower voltage output is required, the full-bridge is controlled to enter the buck mode, so as to reduce the voltage to satisfy the requirements of different loads. The control chip U7 maintains the output in a constant voltage or current mode by precisely controlling the duty ratio of the full-bridge circuit in the constant voltage/current mode to stabilize the input of the load. The multi-mode control mode enables the system to operate with optimal energy efficiency under different operational states, improving the stability and response speed of the system.

Furthermore, the SRP pin and the SRN pin of the control chip U7 are generally connected to two ends of the current detection resistor, and a magnitude of a current flowing through the circuit is detected by sampling a voltage difference across the resistor. Through the two signal acquisition terminals, the main control module 1 (such as a battery management IC or a charging control IC) may monitor current in real time, thereby performing functions such as charging and discharging control and overcurrent protection. In the current detection process, the voltage difference acquired by the SRP and the SRN may be compared with an internal reference voltage for the IC to determine a direction and magnitude of the current. This signal acquisition method is commonly used in the charging management circuit to ensure the charging and discharging safety of the battery and the supercapacitors 21. Similarly, the ACN and ACP pins have the same operation principle.

Figure 4:
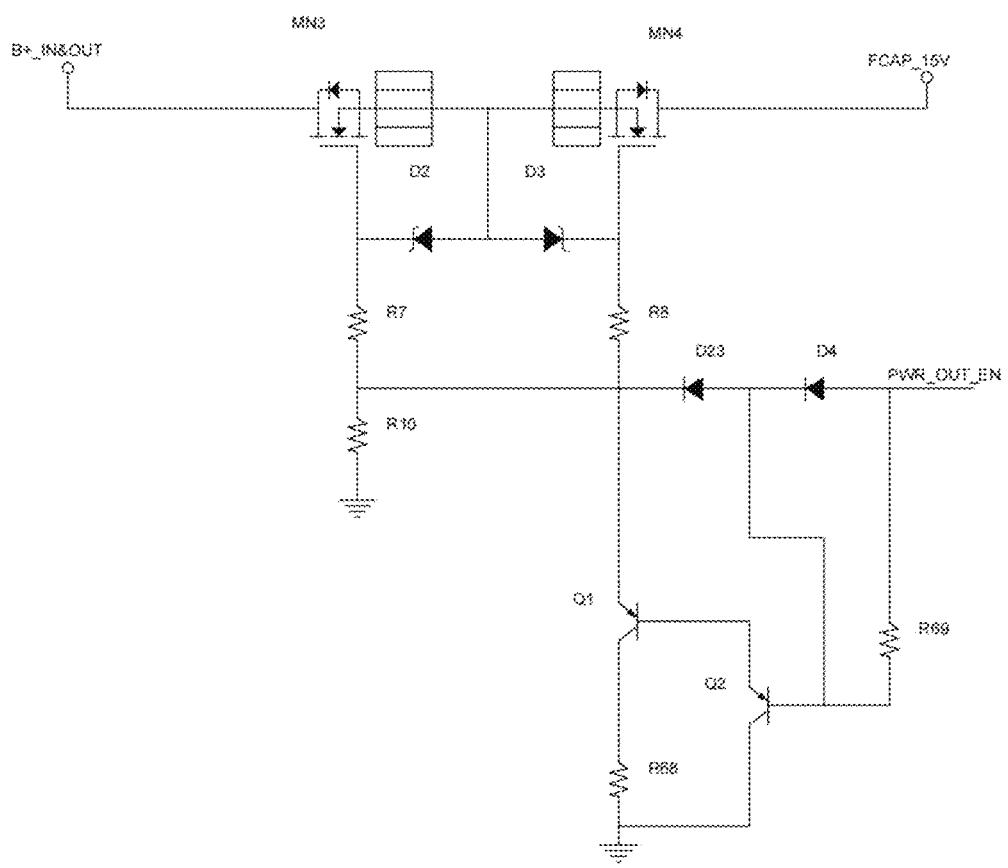
FIG. 4 is a schematic diagram of a partial circuit structure of a discharging control module in the supercapacitor control circuit for intelligently identifying a starting mode of a vehicle according to an embodiment of the present application.

Further, as shown in FIG. 4, the discharging control module 4 includes a MOS transistor MN3, a MOS transistor MN4, a triode Q1, a triode Q2, a diode D23 and a diode D4. The MOS transistor MN4 has a first conduction terminal connected to the power supply output terminal of the supercapacitor bank 2, and a second conduction terminal connected to a first conduction terminal of the MOS transistor MN3. A second conduction terminal of the MOS transistor MN3 is configured to output an auxiliary current. The second enable signal output terminal of the main control module 1 is connected to a positive terminal of the diode D4, and a negative terminal of the diode D4 is connected to a positive terminal of the diode D23. A common node between a controlled terminal of the MOS transistor MN3 and the ground is connected to a negative terminal of the diode D23, and a common node between a controlled terminal of the MOS transistor MN4 and a first conduction terminal of the triode Q1 is connected to the negative terminal of the diode D23. A second conduction terminal of the triode Q1 is grounded. The triode Q2 is connected between the controlled terminal of the triode Q1 and the ground, and a controlled terminal of the triode Q2 is connected to the second enable signal output terminal of the main control module 1. A common node between the negative terminal of the diode D4 and the positive terminal of the diode D23 is connected to the controlled terminal of the triode Q2.

In this embodiment, in the discharging control module 4, the output of the auxiliary current of the supercapacitor bank 2 is controlled through the connection of the MOS transistor MN3, the MOS transistor MN4, the triode Q1, the triode Q2,, the diode D23 and the diode D4. The power supply output terminal of the supercapacitor bank 2 is connected to the first conduction terminal of the MOS transistor MN4 to form a starting point for discharging current of the capacitors, and the second conduction terminal of the MOS transistor MN4 is connected to the first conduction terminal of the MOS transistor MN3 to form a complete discharge path. The auxiliary current is output to the starting system of the vehicle through the second conduction terminal of the MOS transistor MN3. The second enable signal output terminal of the main control module 1 is connected to the positive terminal of the diode D4. A main control signal passes through the diode D4 and the negative terminal thereof is connected to the positive terminal of the diode D23, and conduction of a discharge loop is controlled on this path. The controlled terminal of the MOS transistor MN3 is grounded, and a stable grounding path is achieved through the negative terminal of the diode D23, so as to ensure that the controlled terminal may correctly trigger the path during discharging. A common node formed between the controlled terminal of the MOS transistor MN4 and the first conduction terminal of the triode Q1 is connected to the negative terminal of the diode D23, and the second conduction terminal of the triode Q1 is grounded, thereby realizing shunt control on the current of the supercapacitors 21 under the action of the control signal. The triode Q2 is connected in series between the controlled terminal of the triode Q1 and ground, and is connected to the second enable signal output terminal of the main control module 1 through the controlled terminal of the triode Q2. When a discharge signal is output by the main control module 1, the conduction of Q1 may be triggered by the on-off state of the transistor Q2 as needed, and thus the on-state of the MOS transistor MN4 is controlled to ensure a smooth control of the discharge path. Meanwhile, the common node between the negative terminal of the diode D4 and the positive terminal of the diode D23 is connected to the controlled terminal of the triode Q2, which forms a protection mechanism of a signal loop and avoids current flowing reversely to damage the circuit. In this design, the main control module 1 flexibly controls on and off of the MOS transistors MN4 and MN3 by outputting enable signals with different duty ratios, so as to adjust the magnitude of the auxiliary current, thereby satisfying current requirements under different starting conditions, and ensuring stability and reliability of the starting process.

Specifically, the first conduction terminal of the MOS transistor MN4 is connected to the power supply output terminal of the supercapacitor bank 2, which means that the output current of the supercapacitor bank 2 will pass through the MOS transistor MN4. The second conduction terminal of the MOS transistor MN4 is connected to the first conduction terminal of the MOS transistor MN3 to form a current flow path. The second conduction terminal of the MOS transistor MN3 is used to output the auxiliary current to the load or other modules. The second enable signal output terminal of the main control module 1 is connected to the positive terminal of the diode D4, so that the operation states of the diode D4 and the diode D23 may be affected by controlling the enable signal. The negative terminal of the diode D4 is connected to the positive terminal of the diode D23 to form a series diode structure, which helps to control a direction of the current and prevent reverse current. When the main control module 1 sends a second enable signal, the signal will pass through the diode D4 and the diode D23 to affect the on-off state of the MOS transistor MN3 and the MOS transistor MN4, and when there is a signal at the second enable signal output terminal of the main control module 1, it will directly drive the triode Q2. When the triode Q2 is turned on, a base of the triode Q1 is pulled down, so that the triode Q1 is also turned on, thereby affecting the operation states of the diode D23 and the MOS transistor MN3. When the second enable signal output terminal of the main control module 1 provides a high-level signal, the triode Q2 is turned on, so that a potential at the base of the triode Q1 is reduced, and the triode Q1 is also turned on. Meanwhile, potentials at gates of the MOS transistor MN3 and the MOS transistor MN4 are controlled through the on-off states of the triode Q1 and the triode Q2, thereby realizing the management of the discharge of the supercapacitor 21. The series structure of the diode D4 and the diode D23 also ensures unidirectional flow of current, avoiding potential reverse current issues in the discharge process.

Furthermore, the common node between the negative terminal of the diode D4 and the positive terminal of the diode D23 is connected to the controlled terminal of the transistor Q2 to achieve selective conduction. When either D23 or D4 is in an ON state, the current may flow to the PWR_OUT_EN through one of the diodes, and a flow direction of the current is controlled according to different input conditions. For example, if a certain power supply in the input path fails or the voltage is insufficient, an appropriate current path may be automatically selected through the direction of the diode to ensure stable output.

Figure 7:
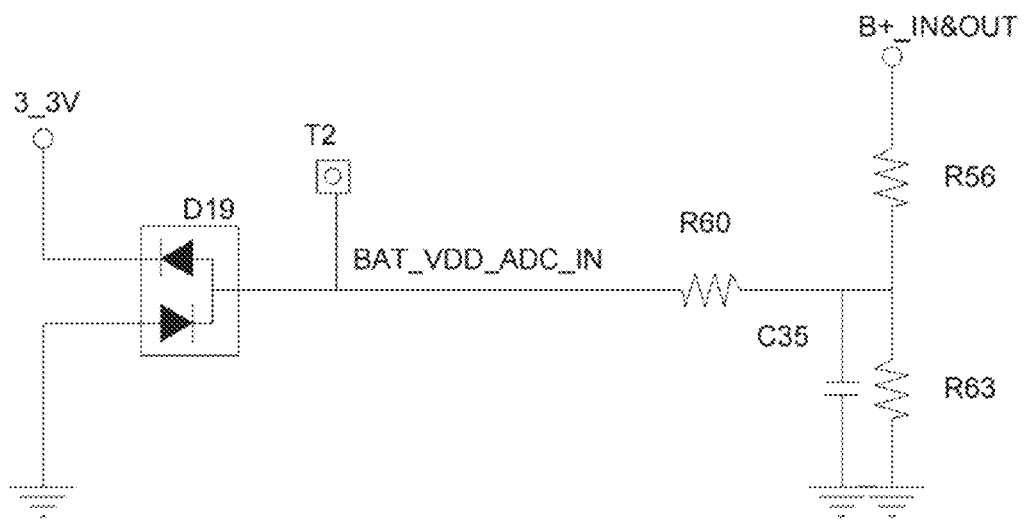
FIG. 7 is a schematic diagram of a partial circuit structure of a first voltage sampling module in the supercapacitor control circuit for intelligently identifying a starting mode of a vehicle according to an embodiment of the present application.

As shown in FIG. 7, the first voltage sampling module includes a resistor R56, a resistor R63, a resistor R60 and a diode D19. The parallel connection point formed between the power supply output terminal of the discharging control module 4 and the power supply output terminal of the battery is connected to a first terminal of the resistor R56, a second terminal of the resistor R56 is connected to a first terminal of the resistor R63, and a second terminal of the resistor R63 is grounded. A common node between the second terminal of the resistor R56 and the first terminal of the resistor R63 is connected to a first terminal of the resistor R60, a second terminal of the resistor R60 is connected to a pin 3 of the diode D19, a pin 2 of the diode D19 is connected to the power supply, and a pin 1 of the diode D19 is grounded. A common node between the second terminal of the resistor R60 and the pin of the diode D19 is connected to a test point T2.

In this embodiment, the voltage between the power supply output terminal of the discharging control module 4 and the power supply output terminal of the battery is accurately acquired through synergistic effect of the resistor R56, the resistor R63, the resistor R60 and the diode D19 in the first voltage sampling module. Specifically, the parallel connection point formed by the power supply output terminal of the discharging control module 4 and the power output terminal of the battery is connected to the first terminal of the resistor R56, and a parallel connected voltage signal is introduced into the circuit in this connection manner. The second terminal of the resistor R56 is connected to the first terminal of the resistor R63, and the second terminal of the resistor R63 is grounded, so that a basic resistor voltage divider network is formed for appropriately dividing a high-voltage signal for subsequent acquisition process. The common node between the second terminal of the resistor R56 and the first terminal of the resistor R63 is connected to the first terminal of the resistor R60, and thus a divided voltage signal is further adjusted to ensure that the voltage value received by the subsequent circuit is in an appropriate range. The second terminal of the resistor R60 is connected to the pin 3 of the diode D19, and the pin 2 of the diode D19 is connected to the power supply, so as to form a clamping protection against overvoltage. If the voltage in the circuit exceeds a set threshold, the diode D19 is turned on instantaneously, and the excessive voltage is guided to the ground, thereby protecting the subsequent circuit from the high voltage. The pin 1 of diode D19 is grounded, forming a reliable ground connection to quickly direct excess voltage to the ground when an overvoltage occurs. The common node between the second terminal of the resistor R60 and the pin 3 of the diode D19 is connected to the test point T2, so that the main control module 1 may monitor the acquired voltage signal through the test point T2. Through the combination of voltage division, filtering and overvoltage protection described above, it is ensured that the parallel connected voltage signals acquired are stable and accurate, and the subsequent circuit is protected when voltage fluctuation occurs, thereby effectively monitoring the output voltage of the battery and the supercapacitors 21 in parallel connection, and supporting the stable operation of the system under different operation conditions.

In conclusion, accurate battery voltage values may be acquired at different voltage points to ensure a stable and reliable data transmission to the main control module 1, thereby achieving an accurate monitoring of voltage signals and improving the voltage acquisition precision of the system and the judgment accuracy of battery states.

Figure 6:
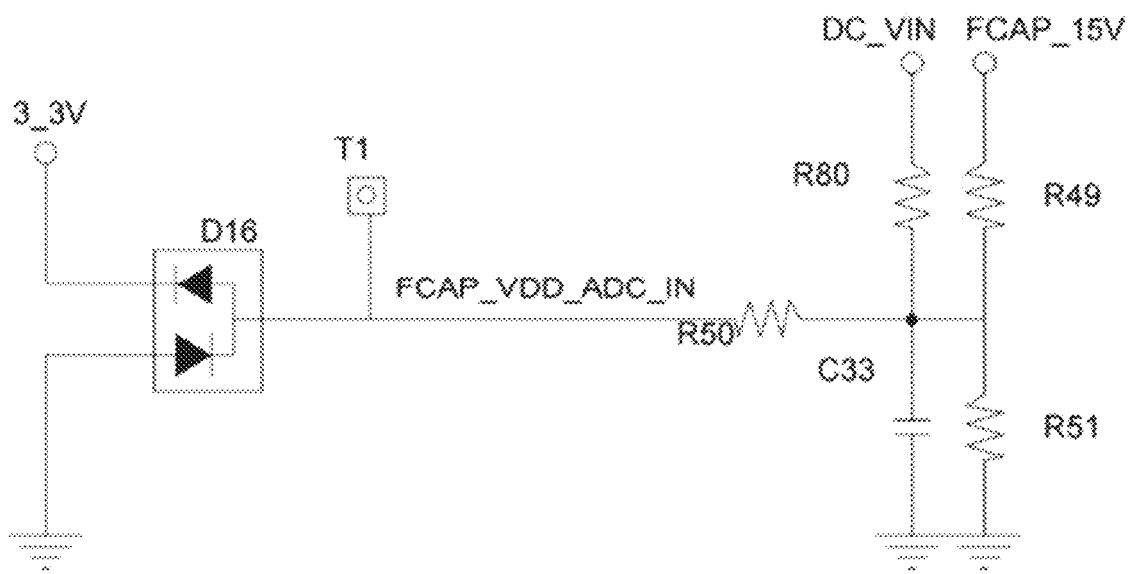
FIG. 6 is a schematic diagram of a partial circuit structure of a second voltage sampling module in the supercapacitor control circuit for intelligently identifying a starting mode of a vehicle according to an embodiment of the present application.

As shown in FIG. 6, the second voltage sampling module includes a resistor R49, a resistor R51, a resistor R50, a resistor R80 and a diode D16. The common node between the power supply output terminal of the supercapacitor bank 2 and the power supply input terminal of the discharging control module 4 is connected to a first terminal of the resistor R49, a second terminal of the resistor R49 is connected to a first terminal of the resistor R51, and a second terminal of the resistor R51 is grounded. A common node between the second terminal of the resistor R49 and the first terminal of the resistor R51 is connected to a first terminal of the resistor R50. The common node between the power supply output terminal of the battery and the power supply input terminal of the charging control module 3 is connected to a first terminal of the resistor R80. A common node between a second terminal of the resistor R80 and the ground is connected to a first terminal of the resistor R50. A second terminal of the resistor R50 is connected to a pin 3 of the diode D16, a pin 2 of the diode D16 is connected to the power supply, a pin 1 of the diode D16 is grounded. A common node between the second terminal of the resistor R50 and the pin 3 of the diode D16 is connected to a test point T1.

In this embodiment, accurate acquisition and protection of voltage states of the supercapacitor bank 2 and the battery are achieved through connection of the resistor R49, the resistor R51, the resistor R50, the resistor R80 and the diode D16 in the second voltage sampling module. The common node between the power supply output terminal of the supercapacitor bank 2 and the power supply input terminal of the discharging control module 4 is connected to the first terminal of the resistor R49, and the output voltage signal of the supercapacitor bank 2 may be introduced into the circuit through this design. The second terminal of the resistor R49 is connected to the first terminal of the resistor R51, and the second terminal of the resistor R51 is grounded to form a basic voltage divider network, which ensures that the voltage is divided reasonably when passing through the module and avoids influence of fluctuations caused by direct acquisition of high-voltage signals on subsequent circuits. The common node between the second terminal of the resistor R49 and the first terminal of the resistor R51 is connected to the first terminal of the resistor R50, to further adjust and stabilize the divided voltage signal, thereby ensuring signal stability. Meanwhile, the common node between the power supply output terminal of the battery and the power supply input terminal of the charging control module 3 is connected to the first terminal of the resistor R80, so that the power supply voltage of the battery may be introduced into the module for synchronous acquisition. The second terminal of the resistor R80 is connected to the ground, and a common node is formed between the second terminal of the resistor R80 and the first terminal of the resistor R50, so that the resistor R50 may simultaneously receive the voltage information of the supercapacitor bank 2 and the battery, thereby ensuring comprehensive analysis of the voltage difference between the supercapacitor bank and the battery. The second terminal of the resistor R50 is connected to the pin 3 of the diode D16 to provide an overvoltage protection function. If the voltage exceeds a set threshold, the diode D16 is turned on and the excessive voltage is guided to the ground, thereby protecting the subsequent circuit from the high voltage. The pin 2 of the diode D16 is connected to the power supply, and the pin 1 thereof is grounded, ensuring a clear path of the protected voltage. The common node between the second terminal of the resistor R50 and the pin 3 of the diode D16 is connected to the test point T1, so that the main control module 1 may monitor the acquired voltage signal in real time through the test point T1. Through the combination of voltage division, filtering and overvoltage protection, the key voltage information of the supercapacitor bank 2 and the battery is acquired effectively by the module, and the stable transmission of the voltage signal under the fluctuation condition is ensured, thereby supporting the safe and stable operation of the system during charging and discharging.

In summary, dual acquisition of the voltage of the supercapacitor bank 2 and the voltage of the battery may be achieved to accurately reflect the voltage difference between the two power supply modules. Also, the acquired signals are fed back to the main control module 1, thereby improving the real-time monitoring capability of the system on the power supply voltage status and ensuring the safety and stability of the charging and discharging process.

Figure 8:
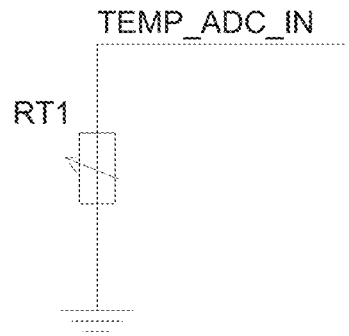
FIG. 8 is a schematic diagram of a partial circuit structure of a temperature sensing unit in the supercapacitor control circuit for intelligently identifying a starting mode of a vehicle according to an embodiment of the present application.
Figure 9:
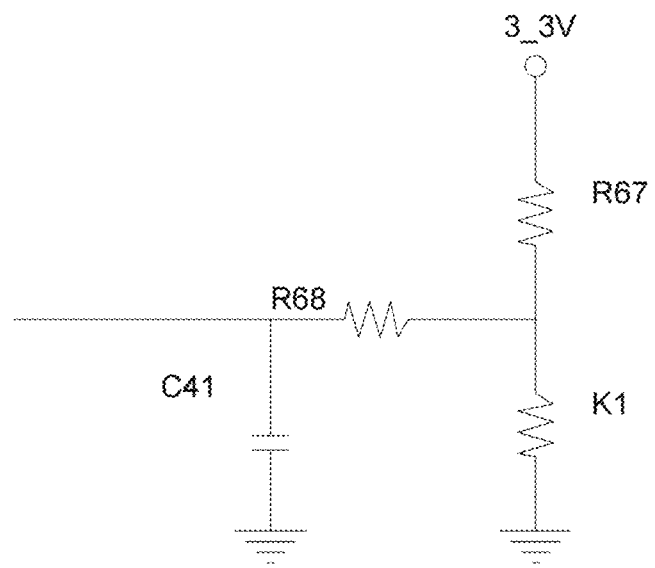
FIG. 9 is a schematic diagram of a partial circuit structure of a vibration sensing unit in the supercapacitor control circuit for intelligently identifying a starting mode of a vehicle according to an embodiment of the present application.

As shown in FIGS. 1, 8 and 9, the environmental information acquisition module includes a temperature sensing unit 71 and a vibration sensing unit 72. The temperature sensing unit 71 includes a thermistor RT1 having a first terminal grounded and a second terminal connected to the third sampling signal input terminal of the main control module 1. The vibration sensing unit 72 includes a resistor R67, a resistor R68 and a vibration sensing element K1. The resistor R67 has a first terminal connected to the power supply and a second terminal connected to a first terminal of the vibration sensing element K1, and a second terminal of the vibration sensing element K1 is grounded. A common node between the second terminal of the resistor R67 and the first terminal of the vibration sensing element K1 is connected to the first terminal of the resistor R68, and a second terminal of the resistor R68 is connected to the third sampling signal input terminal of the main control module 1.

In this embodiment, in the environmental information acquisition module, the temperature sensing unit 71 and the vibration sensing unit 72 are connected to realize a real-time monitoring of the temperature and vibration condition of the external environment of the vehicle, so as to provide assistance in judging the starting mode of the vehicle. The temperature sensing unit 71 includes a thermistor RT1 having a first terminal grounded and a second terminal connected to the third sampling signal input terminal of the main control module 1. Using the temperature-sensitive characteristics of the thermistor RT1, the main control module 1 may receive the voltage signal converted from the resistance value due to temperature changes in real time, thereby measuring the external temperature. The design provides basic data of temperature information for the main control module 1, which is used to determine whether the output current of the supercapacitor bank 2 needs to be adjusted during starting, and especially in a low-temperature or high-temperature environment, the current for starting may be adjusted to optimize the starting effect by using this information. The vibration sensing unit 72 includes a resistor R67, a resistor R68 and a vibration sensing element K1, and is configured to acquire vibration information of the vehicle in starting. A first terminal of the resistor R67 is connected to the power supply, a second terminal thereof is connected to a first terminal of the vibration sensing element K1, and a second terminal of the resistor K1 is grounded, so that a vibration detection loop is formed. When external vibration occurs, the resistance value of the vibration sensing element K1 changes, causing the voltage signals to fluctuate at the common node thereof, and thus the vibration information is transmitted. The common node between the second terminal of the resistor R67 and the first terminal of the vibration sensing element K1 is connected to the first terminal of the resistor R68, and the second terminal of the resistor R68 is connected to the third sampling signal input terminal of the main control module 1, so that the main control module 1 may detect a voltage change signal caused by vibration, and determine whether the current state is the starting state or the dynamic state in the starting process according to this signal. The temperature and vibration information are input to the third sampling signal input terminal of the main control module 1 through respective signal channels, and the main control module 1 may comprehensively analyze the environment temperature and the vibration state to determine the starting requirement of the vehicle and optimize the output of the starting current.

In conclusion, the environmental information of the vehicle may be acquired in real time, and the output of the starting current may be adjusted automatically in adverse environments such as low temperature and high vibration, so that the starting effect and stability of the system in severe environments are ensured, which effectively improves the intelligence and environment adaptability of the control circuit.

Figure 5A:
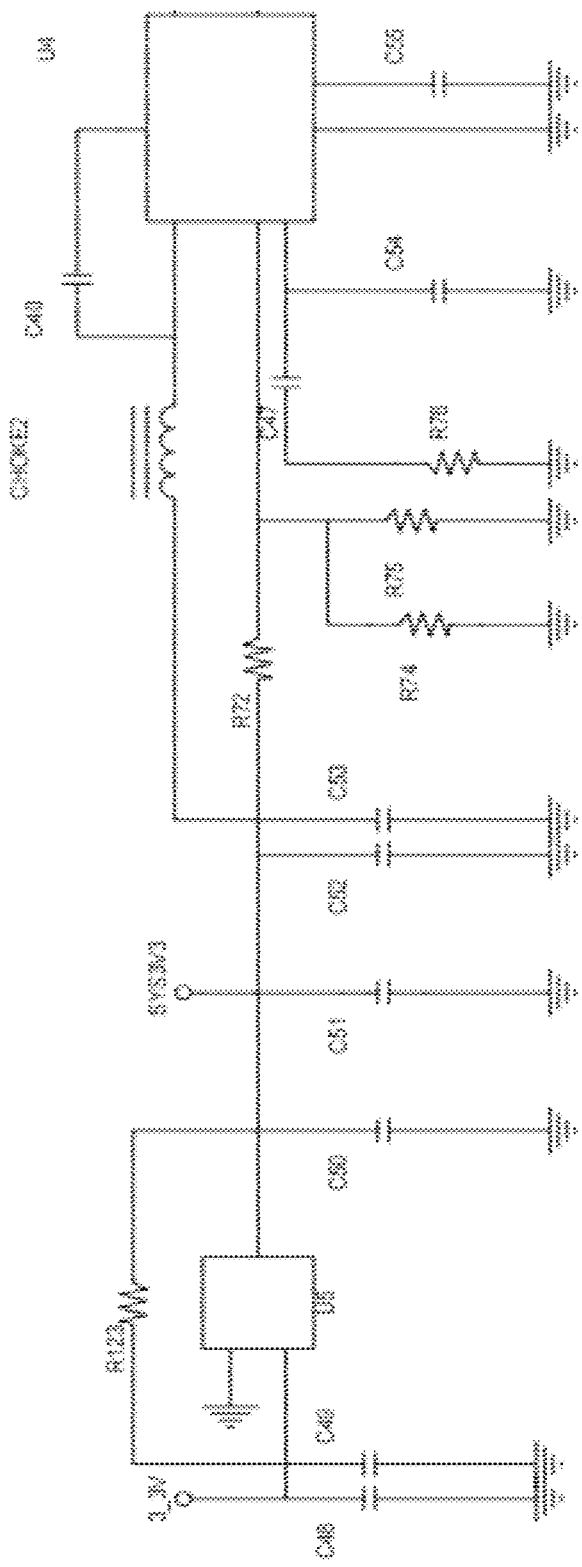
FIG. 5A is a schematic diagram of a first partial circuit structure of a DC-DC power supply module in the supercapacitor control circuit for intelligently identifying a starting mode of a vehicle according to an embodiment of the present application.
Figure 5B:
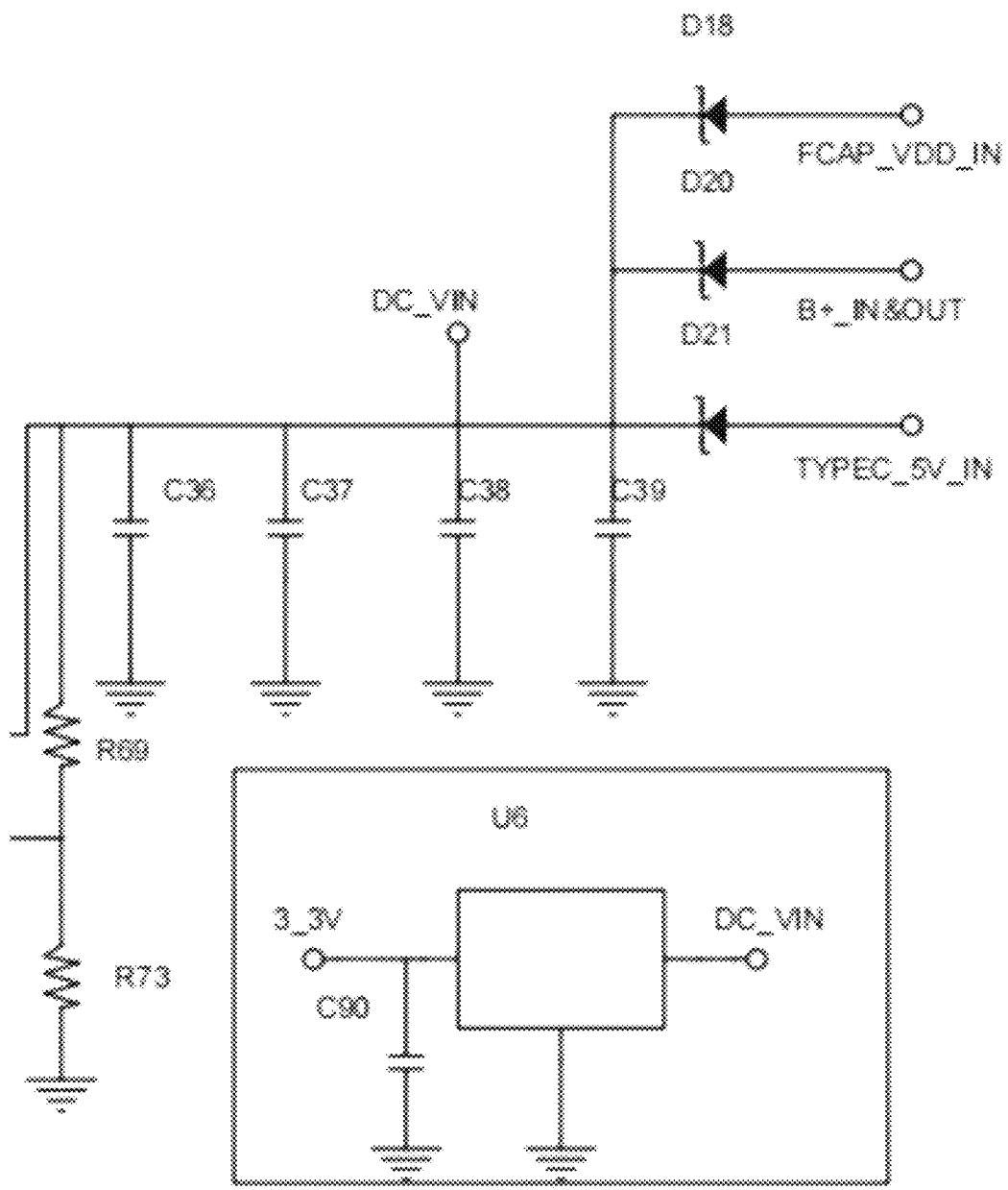
FIG. 5B is a schematic diagram of a second partial circuit structure of the DC-DC power supply module in the supercapacitor control circuit for intelligently identifying the starting mode of the vehicle according to an embodiment of the present application.

Further, as shown in FIGS. 5A-5B, the supercapacitor control circuit for intelligently identifying the starting mode of the vehicle further includes a DC-DC power supply module 8 including a buck conversion chip U4, a voltage regulator chip U5 and a resistor R72. The power supply output terminal of the battery is connected to a power supply input terminal of the buck conversion chip U4, and a power supply output terminal of the buck conversion chip U4 is connected to a first terminal of the resistor R72. A second terminal of the resistor R72 is configured to output a voltage of 4.2V and is connected to a power supply input terminal of the voltage regulator chip U5, and a power supply output terminal of the voltage regulator chip U5 is configured to output a voltage of 3V.

In this embodiment, the super capacitor control circuit for intelligently identifying the starting mode of the vehicle includes a DC-DC power supply module 8. A stable conversion from a high voltage to a low voltage of the battery is realized through the combination of the buck conversion chip U4, the voltage regulator chip U5 and the resistor R72, so as to satisfy the requirement of the control circuit for the low voltage. An input terminal of the DC-DC power supply module 8 is connected to the power supply output terminal of the battery through a power supply input terminal of the buck conversion chip U4, to ensure that a stable high-voltage input may be obtained from the battery. The buck conversion chip U4 is configured for reducing the high voltage of the battery, and the power supply output terminal of the buck conversion chip is connected to the first terminal of the resistor R72. The resistor R72 is used to regulate the voltage, and the voltage is reduced to a level suitable for input of the subsequent voltage regulator chip U5 through voltage division of the resistor R72. A stable voltage of 4.2V is generated at the second terminal of the resistor R72, and the voltage is used as an input of a subsequent circuit on one hand and is supplied to the power supply input terminal of the voltage regulator chip U5 on the other hand. The voltage regulator chip U5 further regulates the voltage of 4.2V to a voltage of 3V, and outputs the regulated voltage from the power supply output terminal thereof, to provide a constant power supply for a low-voltage circuit of the system or another module that needs to be supplied with the voltage of 3V. Through step-wise processing of the buck conversion chip and the voltage regulator chip, the high voltage of the battery is converted into the low voltage of 3V effectively by the DC-DC power supply module 8, so that the power supply requirement of the control module is satisfied. Meanwhile, the subsequent circuit is protected from being directly affected by the input high voltage, and the whole system is ensured to operate safely and reliably under different voltage conditions.

In conclusion, the high voltage of the battery may be converted into the low voltage suitable for the control circuit to ensure the stable operation of the main control module 1 and other low voltage modules, thereby achieving accurate adjustment of the voltage, improving the power supply stability of the system and reducing the withstand voltage requirement of the element.

Figure 11:
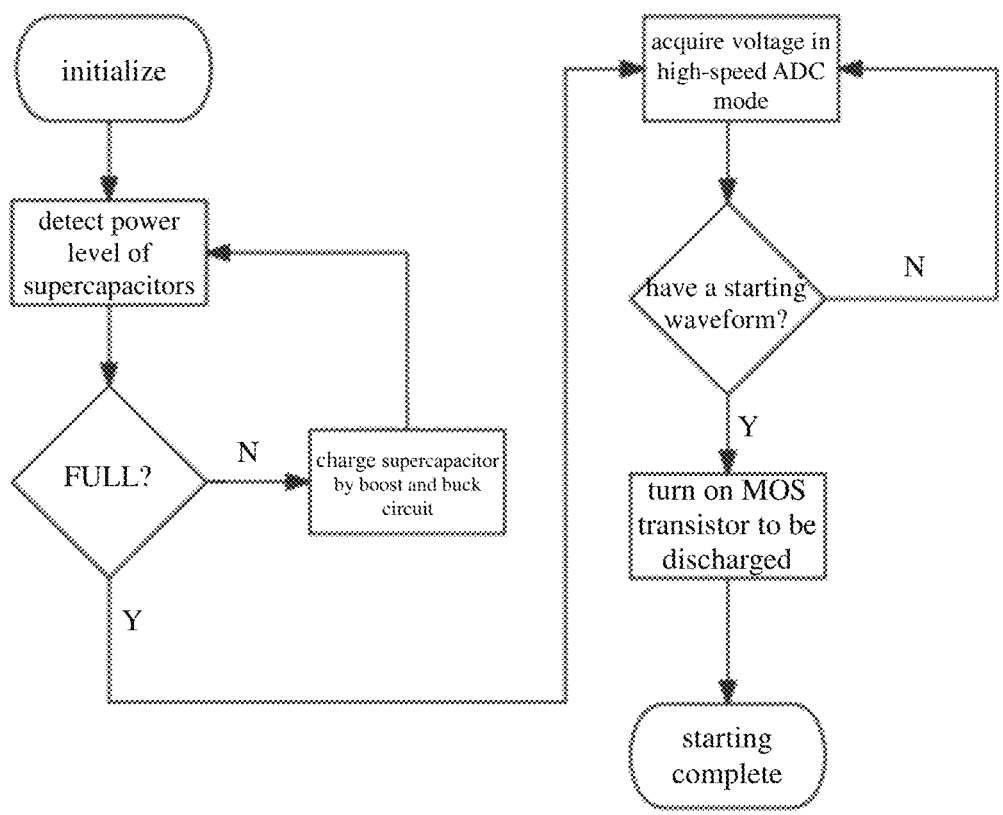
FIG. 11 is a software flowchart of a control method based on the supercapacitor control circuit for intelligently identifying a starting mode of a vehicle according to an embodiment of the present application.
Figure 12:
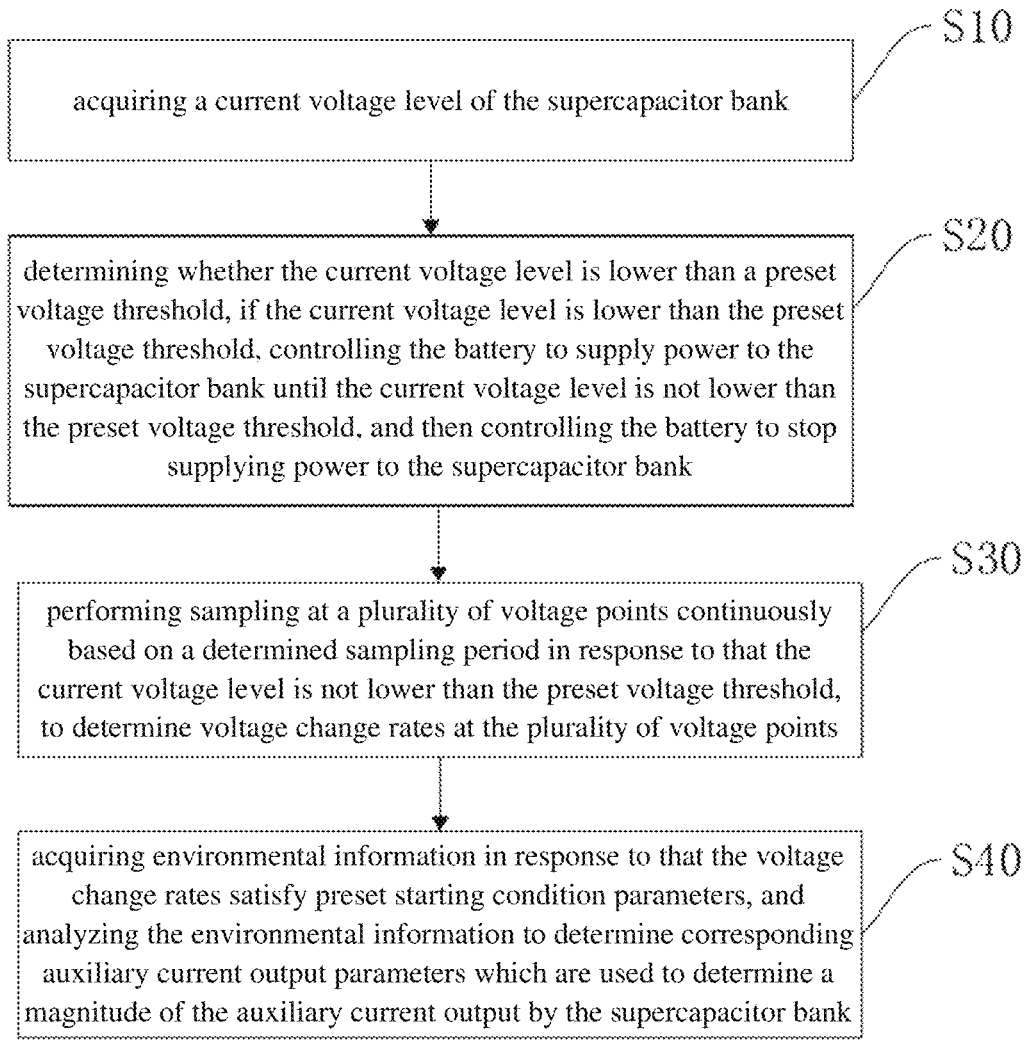
FIG. 12 is a flowchart of a control method based on the supercapacitor control circuit for intelligently identifying a starting mode of a vehicle according to an embodiment of the present application.

As shown in FIGS. 11 and 12, a control method based on a supercapacitor control circuit for intelligently identifying a starting mode of a vehicle is applied to a supercapacitor control circuit for intelligently identifying a starting mode of a vehicle, and the control method includes:

S10: Acquiring a current voltage level of the supercapacitor bank 2. In this embodiment, the current voltage level of the supercapacitor bank 2 is acquired for monitoring a charging state of the supercapacitors 21 in real time. Whether the supercapacitors 21 have enough power to assist in starting may be determined accurately by measuring the actual voltage level of the supercapacitors 21. The current voltage level is a key parameter reflecting the charging state of the supercapacitor bank 2. This step helps to determine whether the supercapacitors 21 have reached preset charging requirements before starting, ensuring that the capacitors have a necessary voltage reserve, so as to provide an auxiliary starting current as needed. For example, when the voltage level of the supercapacitor 21 is lower than a preset threshold, the starting process may face a condition of insufficient voltage, and thus starting failures may be avoided effectively by monitoring the voltage level in time.

S20: Determining, whether the current voltage level is lower than a preset voltage threshold, if the current voltage level is lower than the preset voltage threshold, controlling the battery to supply power to the supercapacitor bank 2 until the current voltage level is not lower than the preset voltage threshold, and then controlling the battery to stop supplying power to the supercapacitor bank 2. In this embodiment, whether the current voltage level is lower than the preset voltage threshold is determined to ensure that the supercapacitor bank 2 may be maintained in an appropriate charging state in any case. When it is detected that the current voltage level is lower than the preset voltage threshold, the control system may automatically start the battery to supply power to the supercapacitor bank 2 until the voltage level of the supercapacitor bank 21 is restored above the set threshold. After the voltage returns to the preset threshold, the system may automatically stop power supply of the battery, to ensure that the supercapacitor bank is not overcharged. This control strategy may ensure sufficient power of the supercapacitors 21 in starting, while avoiding energy waste or potential capacitor damage caused by overcharging. For example, in cold weather, the supercapacitors 21 may need to be charged more frequently due to a rapid voltage drop. The system may ensure that the capacitor bank is always maintained in an appropriate voltage level through the determination step.

S30: Performing sampling at a plurality of voltage points continuously based on a determined sampling period in response to that the current voltage level is not lower than the preset voltage threshold, to determine voltage change rates at the plurality of voltage points. In this embodiment, the plurality of voltage points are sampled continuously by the system according to a set sampling period if the current voltage level is not lower than the preset voltage threshold, so that voltage change data at a series of time points is obtained. The change rate of the voltage over time may be calculated by sampling the voltage values at these points, and these change rates are key bases for determining whether the system is in a starting state. The voltage change rate may reveal the dynamic variation state of the capacitor voltage, especially during the starting of the vehicle, it may be determined whether the supercapacitors 21 are discharged normally or not by analyzing the voltage change rate. For example, when the supercapacitors 21 are discharged rapidly during starting, the voltage change rate will be increased significantly. This data may be used to determine whether the system is in the starting state, and the discharge strategy is adjusted accordingly.

S40: Acquiring environmental information in response to that the voltage change rates satisfy preset starting condition parameters, and analyzing the environmental information to determine corresponding auxiliary current output parameters which are used to determine a magnitude of an auxiliary current output by the supercapacitor bank 2. In this embodiment, whether conditions for engine start is satisfied is determined by detecting the voltage change rate. This method enables intelligent identification of the engine starting action, thereby accurately controlling the discharge behavior of the supercapacitors and avoiding unnecessary energy consumption. Meanwhile, the auxiliary current output parameters are dynamically adjusted by acquiring and analyzing the environmental information (such as temperature, starting frequency, battery state, etc.) of the vehicle, so that the supercapacitors may provide suitable auxiliary current according to actual environmental requirements. The design effectively improves the adaptability of the system to different starting conditions, ensuring reliable starting in complex environments such as different temperatures and battery states, thereby improving usage efficiency of the supercapacitors and safety of the system.

Specifically, in the charging operation of an automobile with a rated voltage of 12V, when the main control module 1 detects that the voltage of the supercapacitor bank 2 is lower than 15V, the battery is used as a power supply, and the main control module 1 controls the charging control module 3 to charge the supercapacitors and stops charging after reaching 15V. In the charging operation of a truck with a rated voltage of 24V, when the main control module 1 detects that the voltage of the supercapacitor bank 2 is lower than 30V, the battery is used as a power supply, and the main control module 1 controls the charging control module 3 to charge the supercapacitors and stops charging after reaching 30V.

The starting of the discharging operation process includes: the first voltage sampling module 5 transmits the voltage signal of the battery to a high-speed ADC sampling interface of the main control module 1, to continuously sample 30 points in a sampling period of 25 μS; when it is detected that the voltage of the battery drops instantaneously, and the parameters satisfy the condition that dv/dt is greater than 4.4V/mS after a large number of different real vehicle tests, it can be considered that the condition for determining that the engine is in the starting process is satisfied, at this time, the main control module 1 outputs a signal for turning on the MOS transistor, and the supercapacitor bank 2 outputs an instantaneous high current (the actual discharge current is related to a displacement and battery of the vehicle) of about 200 to 1500 amps through the discharging control module 4, and discharges with the battery simultaneously to start the engine. The MOS transistor is used here instead of a relay, to solve the problems of delayed activation and high internal resistance associated with the relay.

In conclusion, in this embodiment, the charging process may be started automatically when the voltage of the supercapacitors 21 is lower than the threshold, and the charging is stopped automatically after the preset voltage is reached, thereby effectively preventing the overcharging phenomenon. When conditions for starting is satisfied, the current output is started, and the magnitude of the auxiliary current is adjusted dynamically to ensure the starting success rate and prolong the service life of the battery, thereby improving the intelligent control effect and adaptability of the system.

Figure 13:
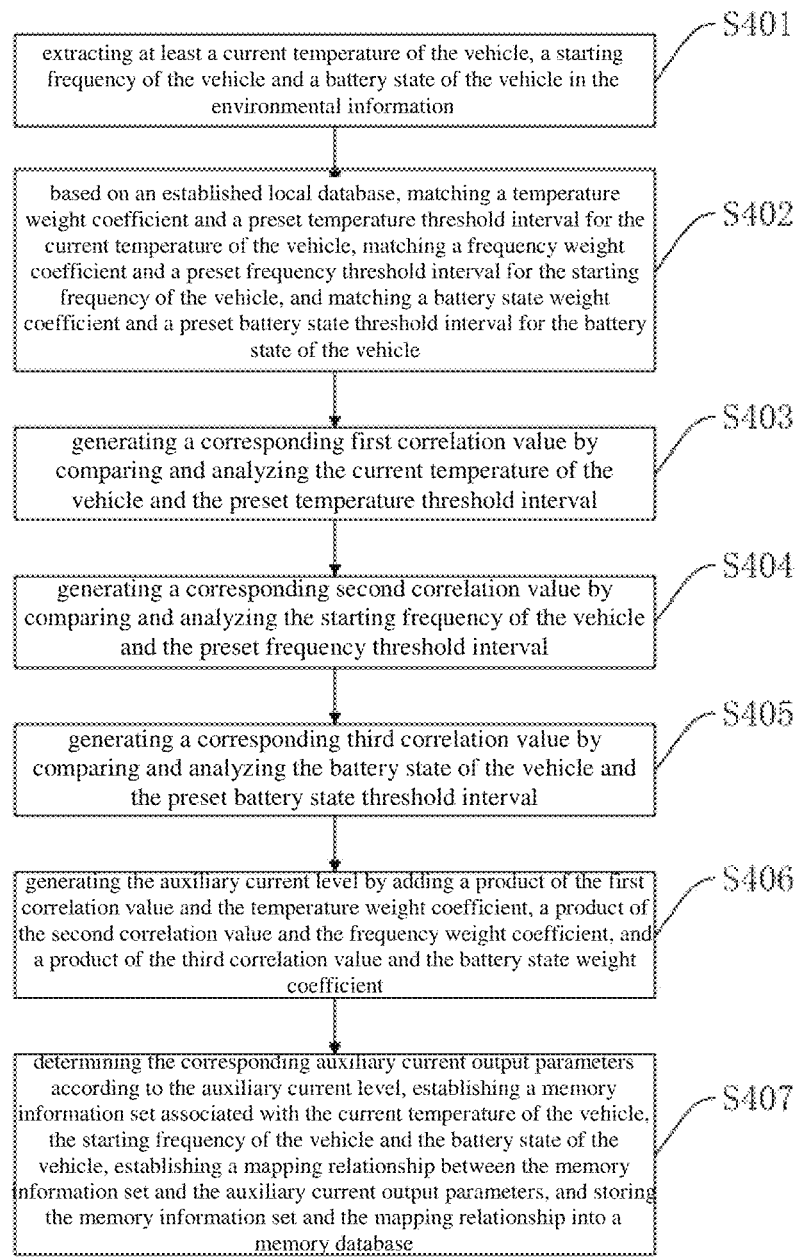
FIG. 13 is an implementation flowchart of step S40 in the control method based on the supercapacitor control circuit for intelligently identifying a starting mode of a vehicle according to an embodiment of the present application.

As shown in FIG. 13, the step of analyzing the environmental information to determine the corresponding auxiliary current output parameters includes:

S401, Extracting at least a current temperature of the vehicle, a starting frequency of the vehicle and a battery state of the vehicle in the environmental information. In this embodiment, the current temperature of the vehicle, the starting frequency of the vehicle and the battery state of the vehicle in the environmental information are extracted for obtaining key data closely related to the starting requirements. The current temperature of the vehicle directly affects the operation efficiency of the battery and supercapacitors 21, and especially at low temperatures, performance of the battery may decline and a higher auxiliary current support is needed. The starting frequency of the vehicle reflects the recent starting of the vehicle, the load of the battery is increased due to high-frequency starting, and the auxiliary current of the capacitors needs to be appropriately increased. The battery state of the vehicle indicates the health of the battery. If the battery state is good, the output auxiliary current may be reduced, otherwise, the auxiliary current is increased to ensure a smooth starting. By extracting these information, the system may accurately master main factors affecting starting, to provide basic data support for subsequent adjustment of the auxiliary current.

S402, Based on an established local database, matching a temperature weight coefficient and a preset temperature threshold interval for the current temperature of the vehicle, matching a frequency weight coefficient and a preset frequency threshold interval for the starting frequency of the vehicle, and matching a battery state weight coefficient and a preset battery state threshold interval for the battery state of the vehicle. In this embodiment, weights and threshold intervals are set for different environmental parameters through setting of the database. The temperature weight coefficient and the preset temperature threshold interval are used for determining influence of the temperature on the starting current. For example, in low-temperature conditions, the temperature weighting coefficient is higher to improve the auxiliary current, while in normal temperature conditions, this weight coefficient is relatively low. The matching of the starting frequency and the frequency weight coefficient is used for analyzing whether additional current support is required for frequent starting and stopping at present, so as to prevent excessive discharge of the battery caused by frequent starting. The battery state weight coefficient is used for evaluating the health of the battery. For example, as the battery ages, the output auxiliary current may be increased by the state weight coefficient. Through these matching rules, the system may set reasonable current weights for different starting conditions, so that the system is ensured to maintain a stable auxiliary starting effect in a complex environment.

S403, Generating a corresponding first correlation value by comparing and analyzing the current temperature of the vehicle and the preset temperature threshold interval. Through this operation in this embodiment, a temperature parameter of the vehicle and the preset temperature interval may be compared by the system, to determine the influence of the current temperature on requirements for the starting current. For example, when the current temperature of the vehicle is lower than a set low temperature interval, the system may set the first correlation value to a relative high value to indicate an increased demand for the auxiliary current under the low temperature condition. However, when the temperature is in a normal interval, the first correlation value is set to a relative low value, thereby reducing the output demand fo the auxiliary current. This step ensures that the system flexibly adjusts the current when the temperature changes and maintains the starting efficiency.

Specifically, assuming that the preset threshold interval for the temperature of the vehicle is 10° C. to 35° C. (which is set by the system according to the optimal operating temperature range of the engine and the battery), when the system detects that the current temperature of the vehicle is 40° C., the main control module 1 may compare the temperature with the preset temperature threshold interval. Since 40° C. exceeds the preset upper limit of 35° C., the system determines that the current temperature is too high, and generates the first correlation value based on the analysis result, to indicate that the current temperature exceeds the upper limit. The first correlation value may be used to trigger a corresponding cooling measure or limit some high power consumption operations, for example, limiting a high current output of the supercapacitors 21, or turning on a cooling fan to cool down, to ensure that the system operates safely.

S404, generating a corresponding second correlation value by comparing and analyzing the starting frequency of the vehicle and the preset frequency threshold interval. The starting frequency of the vehicle directly affects the load of the battery, and whether the recent starting frequency of the vehicle is higher than the normal level may be determined by comparing the starting frequency with the set threshold interval. For example, in the case of high-frequency starting, the second correlation value is set to be a relatively high value to enhance the output of the auxiliary current, thereby balancing the load of the battery. If the starting frequency is lower than the threshold interval, a lower correlation value is generated to avoid unnecessary auxiliary current output. This operation helps to ensure that the battery is supported as necessary during high-load use, extending the service life of the battery.

S405, generating a corresponding third correlation value by comparing and analyzing the battery state of the vehicle and the preset battery state threshold interval. The battery state of the vehicle reflects the health of the battery, and the system may determine whether the battery needs additional current support by comparing the battery state of the vehicle and the preset battery state threshold interval. For example, in the case that the health state of the battery is lower than the set threshold interval, the system may set the third correlation value to be a relatively high value to indicate that the auxiliary current needs to be increased during starting. If the battery state is within the normal threshold interval, a relatively low correlation value is generated. This step ensures that when the battery state is poor, the system may automatically improve current support, to reduce the risk of starting failure, thereby improving the reliability of starting.

S406, generating an auxiliary current level by adding a product of the first correlation value and the temperature weight coefficient, a product of the second correlation value and the frequency weight coefficient, and a product of the third correlation value and the battery state weight coefficient. In this embodiment, the system may quantify comprehensive influence of the environment temperature, the starting frequency and the battery state on demand for the auxiliary current by adding the products of the respective correlation values and the corresponding weight coefficients. For example, in the case of low temperature and high frequency starting, the first and second correlation values are multiplied by higher weight coefficients to increase the auxiliary current level, thereby satisfying requirements for the starting current under complex conditions. This step ensures the accurate current output under different conditions by quantifying the influence of environmental parameters on the current.

Specifically, a specific process in which an intelligent system generates corresponding auxiliary current output parameters according to environmental information (including a current temperature, a starting frequency, and a battery status of a vehicle) is described herein, and current output is mainly determined by using correlation values and weight coefficients.

The generation of correlation values includes comparing and analyzing three items of the environmental information including the current temperature, the starting frequency and the battery state of the vehicle with the corresponding preset threshold intervals respectively, so as to generate the first correlation value, the second correlation value and the third correlation value. A correlation value reflect the proximity of a corresponding current item of the environmental information to an ideal range. For example, the temperature correlation value may reflect the proximity of the current temperature to the preset temperature interval, and the frequency correlation value indicates a deviation degree of the starting frequency of the vehicle relative to the preset frequency interval.

The production of a correlation value and a weight coefficient is obtained by multiplying each correlation value by one weight coefficient. The weight coefficient represents a degree of influence of an information item on the auxiliary current output. For example, the influence of the temperature on the current output may be greater than the starting frequency, and thus the temperature weight coefficient may be higher than the frequency weight coefficient. The contribution of each correlation value to the final current output is amplified or attenuated by the product calculation.

The generation of the auxiliary current level is realized by adding the products of each of the three correlation values and the corresponding weight coefficient. The auxiliary current level indicates a suitable auxiliary current output level in the current environment.

Assuming the following conditions and settings: the current temperature of the vehicle is 40° C., and the preset temperature threshold interval is from 10° C. to 35° C.; the starting frequency of the vehicle is 15 times/day, and the preset frequency threshold interval is from 1 to 10 times/day; the battery state of the vehicle has a health degree of 60%, and the preset battery state threshold interval limits a heath ranges from 80% to 100%.

It is assumed that weight coefficients of the system are as follows: the temperature weight coefficient is 0.5, the frequency weight coefficient is 0.3, and the battery state weight coefficient is 0.2.

Step 1: Generating the correlation values. Regarding the first correlation value, the current temperature of 40° C. is higher than an upper limit of 35° C., and the vehicle is in an overheating state, which may affect the performance of the battery, the temperature correlation value is set to be 1, indicating a complete deviation from the ideal interval. Regarding the second correlation value, the starting frequency of 15 times/day exceeds the upper limit of the normal interval, and the correlation value is set to be 1, indicating frequent starting. Regarding the third correlation value, the battery only has a health degree of 60%, which is lower than the ideal interval, and the correlation value is set to be 1.

Step 2: Calculating a product of the correlation value and the weight coefficient, that is, a temperature contribution value=the temperature correlation value (1)×the temperature weight coefficient (0.5)=0.5; a frequency contribution value =the frequency correlation value (1)×the frequency weight coefficient (0.3)=0.3; and a battery state contribution value=the battery state correlation value (1)× the battery state weight coefficient (0.2)=0.2.

Step 3: Calculating an auxiliary current level, that is, adding all of the contribution values to obtain the auxiliary current level: 0.5+0.3+0.2=1.0.

The final result is that the auxiliary current level is 1.0, indicating that in the current environment needs, the auxiliary current output at the highest level is needed.

The system may output a relative high current according to the level, so as to ensure that the engine may be successfully started under the conditions of frequent high-temperature starting and poor battery health state. In this way, through the comprehensive calculation of the correlation values and the weight coefficients, the auxiliary current output level is adjusted automatically by the system according to the current environmental condition, so that different starting requirements are satisfied.

S407: Determining the corresponding auxiliary current output parameters according to the auxiliary current level, establishing a memory information set associated with the current temperature of the vehicle, the starting frequency of the vehicle and the battery state of the vehicle, establishing a mapping relationship between the memory information set and the auxiliary current output parameters, and storing the memory information set and the mapping relationship into a memory database. In this embodiment, the system is enabled to record the relationship between historical starting conditions and the auxiliary current output, providing a quick reference for similar conditions in the future. For example, under similar low temperature and high frequency starting conditions, the system may directly call the previous auxiliary current output parameters from the memory database, thereby improving the response speed and continuously optimizing the starting strategy in long-term operation. The memory function ensures the adaptability of the system, so that the system has a higher intelligent level in a complex environment. Specifically, the determination of the corresponding auxiliary current output parameters according to the auxiliary current level may include controlling on-time of the MOS transistor in the discharging control module 4 by pulse width modulation (PWM) between the supercapacitors 21 and the starting circuit of the engine. The output current of the supercapacitors 21 may be accurately controlled by adjusting the duty ratio of the PWM signal. The duty ratio of the PWM signal may be increased when a high starting current is required, so that the MOS transistor is turned on for a long time, thereby outputting a higher current. When a low starting current is required, the duty ratio is reduced, and the output current is reduced. This method is flexible in control, and the current may be adjusted smoothly, and the fast response of the MOS transistor makes the output current adjustment more timely.

In another embodiment, a multi-level current limiting circuit may be provided between the supercapacitors 21 and the load, and the output current may be changed by switching different resistance values. The multi-range current-limiting resistor may be used to adjust the output current by controlling connection of different resistors through the main control module 1. Before starting, the main control module 1 controls different resistance ranges in the current-limiting circuit according to the actual requirements of the vehicle, so as to set different currents required for starting. For example, when a high-displacement engine is started, the resistor is selected to have a low resistance value, and larger current output is allowed; and when a small-displacement engine is started, the resistor is selected to have a high resistance value, current output is limited. The method may be realized simply, and the current may be output with different magnitudes, which is suitable for scenes with fixed requirements for the starting current.

In conclusion, the step of the environmental information analysis is performed based on the temperature weight coefficient, the frequency weight coefficient and the battery state weight coefficient, and the auxiliary current level is generated in combination with the local database, so that the optimal auxiliary current may be output under different conditions, the energy consumption is reduced, and the system stability is ensured. The mapping relationship for conditions is established by using the memory database, so that the output current can be optimized continuously, and the adaptability and the energy utilization efficiency of the system are improved.

The foregoing embodiments are only used to describe the technical solutions of the present application, but not to limit the present application. Although the present application is described in detail with reference to the foregoing embodiments, those skilled in the art should understand that the technical solutions described in the foregoing embodiments may be modified, or some technical features in the foregoing embodiments may be equivalently substituted. These modifications or substitutions do not make the essence of the corresponding technical solutions depart from the spirit and scope of the technical solutions of the embodiments of the present application, and should be included in the protection scope of the present application.

LIST OF REFERENCE SIGNS

1 main control module
2 supercapacitor bank
21 supercapacitor
22 voltage-equalizing resistor
3 charging control module
4 discharging control module
5 first voltage sampling module
6 second voltage sampling module
7 environmental information acquisition module
71 temperature sensing unit
72 vibration sensing unit
8 DC-DC power supply module

What is claimed is:

1. A supercapacitor control circuit for intelligently identifying a starting mode of a vehicle, comprising a main control module, a supercapacitor bank, a charging control module, a discharging control module, a first voltage sampling module, a second voltage sampling module and an environmental information acquisition module, wherein a power supply input terminal of the charging control module is connected to a power supply output terminal of a battery configured to provide charging power, a power supply output terminal of the charging control module is connected to a power supply input terminal of the supercapacitor bank for receiving charging current for energy storage, an enable signal input terminal of the charging control module is connected to a first enable signal output terminal of the main control module for outputting a first enable signal to control a start and stop of a charging process, a power supply output terminal of the supercapacitor bank is connected to a power supply input terminal of the discharging control module for receiving energy storage current of the supercapacitor bank and performing discharge control, a power supply output terminal of the discharging control module is connected in parallel to the power supply output terminal of the battery for cooperating with the battery to output an instantaneous current required for vehicle start-up, an enable signal input terminal of the discharging control module is connected to a second enable signal output terminal of the main control module for outputting a second enable signal to adjust a magnitude of discharge current, a parallel connection point formed between the power supply output terminal of the discharging control module and the power supply output terminal of the battery is connected to a signal input terminal of the first voltage sampling module for collecting an output voltage of the battery and the supercapacitor bank after parallel connection, a signal output terminal of the first voltage sampling module is connected to a first sampled signal input terminal of the main control module, the output voltage is transmitted to the main control module, a signal output terminal of the second voltage sampling module is connected to a second sampled signal input terminal of the main control module to provide voltage data to the main control module, the environmental information acquisition module is configured to acquire environmental information of the vehicle, a signal output terminal of the environmental information acquisition module is connected to a third sampled signal input terminal of the main control module for receiving the environmental information and generating corresponding discharge control strategies, and the main control module is used to configure discharge enable signals of different duty ratios according to the environmental information and output the discharge enable signals to the discharging control module to adjust a magnitude of an auxiliary current output by the supercapacitor bank, wherein the discharging control module comprises a first metal-oxide semiconductor (MOS) transistor, a second MOS transistor, a first triode, a second triode, a first diode and a second diode, a first conduction terminal of the second MOS transistor is connected to the power supply output terminal of the supercapacitor bank for receiving the energy storage current of the supercapacitor bank, a second conduction terminal of the second MOS transistor is connected to a first conduction terminal of the first MOS transistor for transmitting current to the output terminal, a second conduction terminal of the first MOS transistor is configured to output the auxiliary current, the second enable signal output terminal of the main control module is connected to a positive terminal of the second diode for one-way transmission of the second enable signal, a negative terminal of the second diode is connected to a positive terminal of the first diode for further one-way transmission of the second enable signal, a common node between a controlled terminal of the first MOS transistor and ground is connected to a negative terminal of the first diode for stabilizing potential of the controlled terminal of the first MOS transistor, a common node between a controlled terminal of the second MOS transistor and a first conduction terminal of the first triode is connected to the negative terminal of the first diode for stabilizing potential of the controlled terminal of the second MOS transistor, a second conduction terminal of the first triode is grounded, the second triode is connected between a controlled terminal of the first triode and the ground for triggering conduction, a controlled terminal of the second triode is connected to the second enable signal output terminal of the main control module for receiving the discharge enable signals, and a common node between the negative terminal of the second diode and the positive terminal of the first diode is connected to the controlled terminal of the second triode for selective conduction.

2. The supercapacitor control circuit for intelligently identifying the starting mode of the vehicle according to claim 1, wherein the supercapacitor bank comprises a plurality of supercapacitors sequentially connected in series, each of the plurality of supercapacitors is rated for a withstand voltage of 3V, and is connected in parallel with a voltage-equalizing resistor.

3. The supercapacitor control circuit for intelligently identifying the starting mode of the vehicle according to claim 1, wherein the charging control module comprises an input filter unit, a third MOS transistor, a fourth MOS transistor, a fifth MOS transistor, a sixth MOS transistor, a seventh MOS transistor, a control chip and a bidirectional protection diode, wherein a power supply input terminal of the input filter unit is connected to the power supply output terminal of the battery, a power supply output terminal of the input filter unit is connected to a first conduction terminal of the third MOS transistor, a second conduction terminal of the third MOS transistor is connected to a first conduction terminal of the fifth MOS transistor, a second conduction terminal of the fifth MOS transistor is grounded, the sixth MOS transistor is connected between a common node between the second conduction terminal of the third MOS transistor and the first conduction terminal of the fifth MOS transistor and ground, the common node between the second conduction terminal of the third MOS transistor and the first conduction terminal of the fifth MOS transistor is connected to a first conduction terminal of the fourth MOS transistor, a second conduction terminal of the fourth MOS transistor is connected to a first conduction terminal of the seventh MOS transistor, a second conduction terminal of the seventh MOS transistor is connected to a positive terminal of the bidirectional protection diode, a negative terminal of the bidirectional protection diode is connected to the power supply input terminal of the supercapacitor bank, a common node between the power supply output terminal of the input filter unit and the first conduction terminal of the third MOS transistor is connected to a first signal acquisition terminal of the control chip, a common node between the second conduction terminal of the seventh MOS transistor and the positive terminal of the bidirectional protection diode is connected to a second signal acquisition terminal of the control chip, and each of the third MOS transistor, the fourth MOS transistor, the fifth MOS transistor, the sixth MOS transistor and the seventh MOS transistor has a controlled terminal connected to the control chip.

4. The supercapacitor control circuit for intelligently identifying the starting mode of the vehicle according to claim 1, wherein the first voltage sampling module comprises a first resistor, a second resistor, a third resistor and a third diode, the parallel connection point formed between the power supply output terminal of the discharging control module and the power supply output terminal of the battery is connected to a first terminal of the first resistor, a second terminal of the first resistor is connected to a first terminal of the second resistor, a second terminal of the second resistor is grounded, a common node between the second terminal of the first resistor and the first terminal of the second resistor is connected to a first terminal of the third resistor, a second terminal of the third resistor is connected to a first pin of the third diode, a second pin of the third diode is connected to a power supply, a third pin of the third diode is grounded, and a common node between the second terminal of the third resistor and the first pin of the third diode is connected to a test point.

5. The supercapacitor control circuit for intelligently identifying the starting mode of the vehicle according to claim 1, wherein the second voltage sampling module comprises a first resistor, a second resistor, a third resistor, a fourth resistor and a third diode, a common node between the power supply output terminal of the supercapacitor bank and the power supply input terminal of the discharging control module is connected to a first terminal of the first resistor, a second terminal of the first resistor is connected to a first terminal of the second resistor, a second terminal of the second resistor is grounded, a common node between the second terminal of the first resistor and the first terminal of the second resistor is connected to a first terminal of the third resistor, a common node between the power supply output terminal of the battery and the power supply input terminal of the charging control module is connected to a first terminal of the fourth resistor, a common node between a second terminal of the fourth resistor and ground is connected to the first terminal of the third resistor, a second terminal of the third resistor is connected to a first pin of the third diode, a second pin of the third diode is connected to a power supply, a third pin of the third diode is grounded, and a common node between the second terminal of the third resistor and the first pin of the third diode is connected to a test point.

6. The supercapacitor control circuit for intelligently identifying the starting mode of the vehicle according to claim 1, wherein the environmental information acquisition module comprises a temperature sensing unit and a vibration sensing unit, the temperature sensing unit comprises a thermistor, a first terminal of the thermistor is grounded, a second terminal of the thermistor is connected to the third sampled signal input terminal of the main control module, the vibration sensing unit comprises a first resistor, a second resistor and a vibration sensing element, a first terminal of the first resistor is connected to a power supply, a second terminal of the first resistor is connected to a first terminal of the vibration sensing element, a second terminal of the vibration sensing element is grounded, a common node between the second terminal of the first resistor and the first terminal of the vibration sensing element is connected to a first terminal of the second resistor, and a second terminal of the second resistor is connected to the third sampled signal input terminal of the main control module.

7. The supercapacitor control circuit for intelligently identifying the starting mode of the vehicle according to claim 1, further comprising a direct current to direct current (DC-DC) power supply module, the DC-DC power supply module comprises a buck conversion chip, a voltage regulator chip and a resistor, wherein the power supply output terminal of the battery is connected to a power supply input terminal of the buck conversion chip, a power supply output terminal of the buck conversion chip is connected to a first terminal of the resistor, a second terminal of the resistor is configured to output a voltage of 4.2V and is connected to a power supply input terminal of the voltage regulator chip, and a power supply output terminal of the voltage regulator chip is configured to output a voltage of 3V.

8. A control method using the supercapacitor control circuit for intelligently identifying the starting mode of the vehicle according to claim 1, comprising:

acquiring a current voltage level of the supercapacitor bank by the first voltage sampling module and the second voltage sampling module;

determining, whether the current voltage level is lower than a preset voltage threshold, by the main control module, and controlling the battery to supply power to the supercapacitor bank by the charging control module under control of the main control module in response to the current voltage level being lower than the preset voltage threshold until the current voltage level is not lower than the preset voltage threshold, and then controlling the battery to stop supplying the power to the supercapacitor bank;

performing sampling at a plurality of voltage points continuously based on a determined sampling period by the first voltage sampling module and the main control module in response to the current voltage level being not lower than the preset voltage threshold, to determine voltage change rates at the plurality of voltage points; and acquiring the environmental information by the environmental information acquisition module in response to the voltage change rates satisfying preset starting condition parameters, and analyzing the environmental information by the main control module to determine corresponding auxiliary current output parameters to be output to the discharging control module to determine the magnitude of the auxiliary current output by the supercapacitor bank, wherein the analyzing the environmental information by the main control module to determine the corresponding auxiliary current output parameters comprises:

extracting at least a current temperature of the vehicle, a starting frequency of the vehicle and a battery state of the vehicle in the environmental information;

based on an established local database, matching a temperature weight coefficient and a preset temperature threshold interval for the current temperature of the vehicle, matching a frequency weight coefficient and a preset frequency threshold interval for the starting frequency of the vehicle, and matching a battery state weight coefficient and a preset battery state threshold interval for the battery state of the vehicle;

comparing and analyzing the current temperature of the vehicle and the preset temperature threshold interval to generate a corresponding first correlation value;

comparing and analyzing the starting frequency of the vehicle and the preset frequency threshold interval to generate a corresponding second correlation value;

comparing and analyzing the battery state of the vehicle and the preset battery state threshold interval to generate a corresponding third correlation value;

adding a product of the first correlation value and the temperature weight coefficient, a product of the second correlation value and the frequency weight coefficient, and a product of the third correlation value and the battery state weight coefficient to generate a corresponding auxiliary current level; and determining the corresponding auxiliary current output parameters according to the auxiliary current level, establishing a memory information set associated with the current temperature of the vehicle, the starting frequency of the vehicle and the battery state of the vehicle, establishing a mapping relationship between the memory information set and the auxiliary current output parameters, and storing the memory information set and the mapping relationship into a memory database.

* * * * *